(12) United States Patent
Kumagai et al.

(10) Patent No.: US 10,016,837 B2
(45) Date of Patent: *Jul. 10, 2018

(54) METHOD OF JOINING HEAT-TREATABLE ALUMINUM ALLOY MEMBERS BY FRICTION STIR WELDING

(71) Applicant: UACJ Corporation, Chiyoda-ku, Tokyo (JP)

(72) Inventors: Masaki Kumagai, Nagoya (JP); Tadashi Minoda, Nagoya (JP); Koji Tanaka, Nagoya (JP)

(73) Assignee: UACJ Corporation, Chiyoda-Ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,957

(22) Filed: Oct. 7, 2016

(65) Prior Publication Data

US 2017/0021447 A1    Jan. 26, 2017

Related U.S. Application Data

(62) Division of application No. 12/486,950, filed on Jun. 18, 2009, now abandoned, which is a division of
(Continued)

(51) Int. Cl.
*B23K 20/00* (2006.01)
*B23K 20/12* (2006.01)
(Continued)

(52) U.S. Cl.
CPC .......... *B23K 20/1235* (2013.01); *B23K 20/24* (2013.01); *C22F 1/00* (2013.01);
(Continued)

(58) Field of Classification Search
None
See application file for complete search history.

(56) References Cited

U.S. PATENT DOCUMENTS

| 5,728,241 A | 3/1998 | Gupta et al. |
| 6,265,701 B1 | 7/2001 | Bickel et al. |

(Continued)

FOREIGN PATENT DOCUMENTS

| JP | 05-044000 A | 2/1993 |
| JP | 05-117826 A1 | 5/1993 |

(Continued)

OTHER PUBLICATIONS

Totten et al., Handbook of Aluminum, 2003, Marcel Dekker, vol. 1, 5-15.*

(Continued)

*Primary Examiner* — Erin B Saad
(74) *Attorney, Agent, or Firm* — Burr & Brown, PLLC

(57) ABSTRACT

A method of joining heat-treatable aluminum alloy members by friction stir welding, including the steps of: a T4-treatment-performing step of performing a T4 treatment on heat-treatable aluminum alloy members so as to impart T4 temper to the heat-treatable aluminum alloy members; a joining step of joining the heat-treatable aluminum alloy members with T4 temper by friction stir welding to provide a joined product; and a reversion-treatment-performing step of performing a reversion treatment, the reversion-treatment-performing step being carried out prior to or after the joining step.

15 Claims, 3 Drawing Sheets

Related U.S. Application Data application No. 11/305,547, filed on Dec. 15, 2005, now abandoned.

(51) Int. Cl.

| | | |
|---|---|---|
| *B23K 20/24* | (2006.01) | |
| *C22F 1/00* | (2006.01) | |
| *C22F 1/05* | (2006.01) | |
| *B23K 101/18* | (2006.01) | |
| *B23K 103/10* | (2006.01) | |

(52) U.S. Cl.
CPC ............ *C22F 1/05* (2013.01); *B23K 2201/18* (2013.01); *B23K 2203/10* (2013.01)

(56) References Cited

U.S. PATENT DOCUMENTS

| | | | |
|---|---|---|---|
| 6,913,186 B2 | 7/2005 | Vyas | |
| 7,078,647 B2 | 7/2006 | Kou et al. | |
| 7,156,277 B2 | 1/2007 | Ishikawa et al. | |
| 7,810,700 B2 * | 10/2010 | Kumagai | B23K 20/1225 228/112.1 |
| 2004/0056075 A1 | 3/2004 | Gheorghe | |
| 2005/0217770 A1 | 10/2005 | Lequeu et al. | |
| 2006/0124701 A1 | 6/2006 | Chen et al. | |
| 2006/0278325 A1 | 12/2006 | Kumagai | |
| 2007/0138235 A1 | 6/2007 | Kumagai et al. | |
| 2007/0138236 A1 | 6/2007 | Agarwal et al. | |
| 2009/0250144 A1 | 10/2009 | Kumagai et al. | |

FOREIGN PATENT DOCUMENTS

| | | |
|---|---|---|
| JP | 07-305151 A1 | 11/1995 |
| JP | 08-246116 A1 | 9/1996 |
| JP | 09-177974 A1 | 7/1997 |
| JP | 10-225781 A1 | 8/1998 |
| JP | 11-104860 A1 | 4/1999 |
| JP | 11-199994 A1 | 7/1999 |
| JP | 2000-061663 A1 | 2/2000 |
| JP | 2001-321948 A1 | 11/2001 |
| JP | 2002-115037 A1 | 4/2002 |
| JP | 2002-294381 A1 | 10/2002 |
| JP | 2002-346770 A1 | 12/2002 |
| JP | 2003-073764 A1 | 3/2003 |
| JP | 2003-080381 A1 | 3/2003 |
| JP | 2003-094175 A1 | 4/2003 |
| JP | 2005-131679 A1 | 5/2005 |
| JP | 2005-131701 A1 | 5/2005 |

OTHER PUBLICATIONS

Heinz et al. "Characterization of a Friction-Stir-Welded Aluminum Alloy 6013", Metallurgical and Materials Transactions B vol. 33B, Jun. 2002—489.*
AWS, Standard Welding Terms and Definitions, 2001, pp. 47, 48.
Aloca Engineered Products Alloy 6061, Aloca, Dec. 2002.

* cited by examiner

METHOD OF JOINING HEAT-TREATABLE ALUMINUM ALLOY MEMBERS BY FRICTION STIR WELDING

CROSS REFERENCE TO RELATED APPLICATION

This application is a division of U.S. patent application Ser. No. 12/486,950, filed Jun. 18, 2009, which is a division of U.S. patent application Ser. No. 11/305,547, filed Dec. 15, 2005, the entireties of which are incorporated herein by reference.

BACKGROUND OF THE INVENTION

Field of the Invention

The present invention relates in general to a method of joining heat-treatable aluminum alloy members by friction stir wielding and a joined product for press forming obtained by the method. More particularly, the invention relates to such a method capable of advantageously providing a joined product with good ductility, accordingly with good press formability while effectively preventing occurrence of fracture at a stir zone and heat-affected zones of the joined product obtained as a result of joining the heat-treatable aluminum alloy members by friction stir welding, and such a joined product for press forming advantageously produced by the method.

Discussion of Related Art

Conventionally, a plate or sheet member made of a heat-treatable aluminum alloy is used as a blank for press forming. Such a blank is subjected to the press forming, thereby producing various kinds of press products. In a press working operation of the heat-treatable aluminum alloy plate member, rather than a T6-treated aluminum alloy plate member (i.e., aluminum alloy plate member with T6 temper) which assures high strength, a T4-treated aluminum alloy plate member (i.e., aluminum alloy plate member with T4 temper) is preferably used because of its excellent ductility and softness lower than the T6-treated aluminum alloy plate member.

In the meantime, in recent years, a plurality of aluminum alloy members are joined together to provide a joined product, and the obtained joined product is subjected to a press working operation, a bending operation and the like for improving a material yield as a result of elimination of cutting and trimming after the press working operation and simplifying the production process. More specifically described, a plurality of aluminum alloy members are butted and welded together into the integrally joined product, thereby providing one blank for press forming, i.e., a so-called tailored blank. A technique of performing suitable press forming on the thus obtained blank is widely employed in the field of a press product for an interior panel of automotive vehicles, for instance.

In addition to the improvement in the material yield and the simplification of the production process, such a press forming technique provides an advantage of utilizing, as a material for the blank, a small-sized metal plate which cannot be used in an ordinary press forming technique. Further, where a blank obtained by joining together the heat-treatable aluminum alloy members having mutually different thickness is used as a blank for press forming, it is easy to produce a press product having required strength at required portions thereof.

As a method of joining the heat-treatable aluminum alloy members for obtaining such a blank for press forming, various welding methods are conventionally employed such as TIG welding (tungsten inert-gas welding), MIG welding (metal inert-gas welding), laser welding, and friction stir welding. Among those, an increasing attention has been drawn to the friction stir welding process which is a sort of solid-phase welding or joining process involving a relatively small amount of heat generation, relatively small degrees of softening and distortion, as compared with a fusion welding process, and therefore assuring a sufficiently high degree of welding strength or joint strength. However, even where the T4-treated members are butted and joined together according to such a friction stir welding process to provide the blank, softening inevitably occurs at heat-affected zones of the blank which are located adjacent to a stir zone at which the T4-treated members are welded and which are affected by a heat generated in the friction stir welding process. If such a blank is used for press forming in the as-welded condition without undergoing any post-treatment, stress concentrates locally on the heat-affected zones at which the strength (hardness) is the lowest due to the heat generated upon welding, so that the heat-affected zones tend to deform faster than the other portion of the blank and often break or fracture. The fracture or breakage at the heat-affected zones raises a problem of limitation in a configuration of the press product to be obtained from the blank and a degree of elongation or ductility (a deformation amount) of the blank.

To deal with the problem indicated above, there have been made: (1) proposals to improve a joint strength of a welded region by performing an age-hardening treatment after the heat-treatable aluminum alloy members have been welded together (as disclosed in the following Patent Documents 1-5); and (2) proposals to improve an overall joint strength of a joined portion including the heat-affected zones by performing an age-hardening treatment after the heat-treatable alloy members have been are joined by friction stir welding (as disclosed in the following Patent Documents 6-8).

The proposals (1) will be explained in detail. Patent Document 1 (JP-A-5-117826) discloses a method of producing a rim made of a high-strength aluminum alloy comprising: forming an aluminum alloy member into a rim shape after performing flush butt welding; and heating the rim-shaped member at a temperature of 170-200° C. Patent Document 2 (JP-A-8-246116) discloses a method of producing an aluminum-alloy made wheel with increased strength comprising: welding a disc made of an Al—Mg—Si series alloy to a rim made of an aluminum alloy; cooling the welded region at a rate of not less than 1° C./second and subsequently heating at a temperature of 100-200° C. for 5-60 minutes. Patent Document 3 (JP-A-9-177974) discloses a technique of restoring a heat-softening phenomenon by a welding heat by performing an aging treatment which involves heating at a temperature of 150-200° C. for not less than 30 minutes after welding. Patent Document 4 (JP-A-11-199994) discloses that a welded member obtained by welding Al—Mg—Si series alloy extruded members is subjected, after quenching, to an aging treatment at a temperature of 150-220° C. for 3-24 hours, for increasing the strength. Patent Document 5 (JP-A-2002-294381) discloses a welded joint of an excess Si-content type JIS-A 6000 series aluminum alloy obtained by welding aluminum alloy members and having joint strength and joint elongation restored by performing an aging treatment at a temperature of not higher than 180° C. for about 10-50 minutes.

The proposals (2) will be explained in detail. Patent Document 6 (JP-A-11-104860) discloses a welded joint with intended strength obtained by: joining together members by friction stir welding; subjecting, immediately after the welding, a welded portion to forced air cooling for placing the welded portion into a hardened state; and performing a suitable artificial age-hardening treatment or natural age-hardening treatment. Patent Document 7 (JP-A-2000-61663) discloses a method of joining aluminum alloy members with T1 temper comprising: joining the members by friction stir welding such that a time period during which heat-affected zones located outwardly of a stirred region are heated at a temperature of not lower than 300° C. is controlled to be within one minute; and performing an aging treatment at a temperature lower than 300° C. for about from 10 minutes to 24 hours, thereby attaining the joint strength that is not less than 95% with respect to yield strength of a base material. Patent Document 8 (JP-A-2002-346770) discloses that aluminum-based alloys whose average crystal grain size is $100\text{-}5\times10^3$ nm are joined together by friction stir welding and then subjected to an aging treatment at a temperature of 100-200° C.

To assure a high degree of joint strength, Patent Document 9 (JP-A-2001-321948) discloses a method of welding heat-treatable aluminum alloy members comprising a step of performing, prior to a welding process such as TIG welding, MIG welding, laser welding and friction stir welding, a sub-aging treatment in which an aging treatment is performed on the aluminum alloy members at a temperature lower than and for a time period shorter than those in aging treatment conditions in which maximum strength is obtained. Patent Document 9 teaches, in its example, a heat treatment carried out at a furnace temperature of 160-200° C. for three hours as the specific conditions of such a sub-aging treatment.

By performing the age-hardening treatment after fusion welding or friction stir welding or by performing the sub-aging treatment before welding as disclosed in the above-indicated Patent Documents, the joint strength is improved. Those Patent Documents, however, are silent about press formability and ductility of the joined product obtained by joining the aluminum alloy members. Accordingly, the strength of the heat-affected zones is lower than those of the welded region and the base material, so that the stress concentrates on the heat-affected zones, causing fracture at the heat-affected zones. Therefore, there still exists the problem of limitation in the configuration of the press product to be obtained from the joined product and the elongation degree (the formable amount) of the joined product.

Further, Patent Document 10 (JP-A-10-225781) discloses a friction stir welding process in which, prior to friction stir welding, a portion ahead of a probe as seen in its moving direction is heated at a temperature of not higher than 500° C., preferably in a range of 100-300° C. using an external heat source such as a laser radiation, a gas flame or a heater. According to the disclosed method, the members are joined without suffering from any failure while improving a rate of joining the members and increasing a service life of the probe. Patent Documents 11 and 12 (JP-A-2003-80381 and JP-A-2003-94175) disclose a technique of heating portions ahead of and behind a joint region at a temperature in a rage of 100-300° C. by means of a welding torch or induction heating for shortening a time before initiation of friction stir welding or for preventing occurrence of cracking at the joined region including the heat-affected zones. In the methods disclosed in those Patent Documents 10-12, although the heat treatment is performed on the aluminum alloy members prior to the friction stir welding, the heat treatment is performed only for reducing resistance to deformation and shortening the time before initiation of friction stir welding. None of these methods aim at refining the aluminum alloy members.

SUMMARY OF THE INVENTION

In the light of the aforementioned situations, the inventors of the present invention have made an extensive study to solve the problems related to the press formability of the joined product obtained by joining together the heat-treatable aluminum alloy members. As a result of the study, it has been found that the concentration of stress on the stir zone and the heat-affected zones during the press forming operation can be avoided by optimizing relationship in strength among the stir zone, the heat-affected zones and the base material, more specifically, by making hardness of the stir zone and the heat-affected zones larger than that of the base material.

For optimizing the relationship in strength among the stir zone, the heat-affected zones and the base material, the inventors have made a study from the metallurgical viewpoint on respective metal structures of the stir zone, heat-affected zones and base material portions after friction stir welding. The study has revealed that the heat-affected zones located in the vicinity of the stir zone and having the lowest hardness are in a state in which the metal structure is rehardened or reverted (in a reversion state). It has been further revealed that the strength or hardness of the base material is effectively reduced as low as or lower than that of the heat-affected zones (a) where a reversion treatment for temporarily extinguishing GP zones (clusters) existing in the metal structure is performed on T4-treated heat-treatable aluminum alloy members in advance and subsequently the aluminum alloy members are joined together by friction stir welding after the reversion treatment or (b) where T4-treated heat-treatable aluminum alloy members are joined together by friction stir welding to provide a joined product and a reversion treatment for temporarily extinguishing GP zones (clusters) is subsequently performed on the joined product for reverting the metal structure of the base material. Consequently, the fracture due to the stress concentration on the heat-affected zones in the press forming can be advantageously avoided and the stress can be effectively distributed over the base material portion with a large area, so that the amount of deformation of the joined product as a whole is advantageously increased. Therefore, the ductility and the breaking elongation of the joined product can be effectively enhanced, leading to an improvement in the press formability.

The present invention has been accomplished based on the findings described above. It is therefore an object of the invention to provide a method of joining heat-treatable aluminum alloy members by friction stir welding, which method is capable of providing a joined product having excellent ductility and accordingly excellent press formability without suffering from fracture at a stir zone and heat-affected zones by optimizing relationship in strength among the stir zone, the heat-affected zones and a base material. Another object of the invention is to provide a joined product for press forming with enhanced press formability advantageously produced by such a method.

To achieve the object indicated above, the present invention provides a method of joining heat-treatable aluminum alloy members by friction stir welding, comprising the steps of: a T4-treatment-performing step of performing a T4 treatment on heat-treatable aluminum alloy members so as to impart T4 temper to the heat-treatable aluminum alloy members; a joining step of joining the heat-treatable aluminum alloy members with T4 temper by friction stir welding to provide a joined product; and a reversion-treatment-performing step of performing a reversion treatment, the reversion-treatment-performing step being carried out prior to or after the joining step.

According to the present method described above, the heat-treatable aluminum alloy members can be joined advantageously so as to provide a joined product with excellent ductility and accordingly excellent press formability.

The present method is classified into two methods according to respective two aspects described below.

In the method according to the first aspect, the reversion-treatment-performing step is carried out prior to the joining step for placing the heat-treatable aluminum alloy members in a reversion state and the joining step is carried out such that the heat-treatable aluminum alloy members in the reversion state are joined together by friction stir welding.

In the method according to the first aspect indicated above, the heat-treatable aluminum alloy members are subjected to the T4 treatment and then to the reversion treatment. Accordingly, the GP zones (or clusters) which are formed in a metal structure of the aluminum alloy members with T4 temper and which are fine phases of several atoms are temporarily extinguished. (Hereinafter, the aluminum alloy members with T4 temper may be referred to as "T4-treated" or "T4 temper" aluminum alloy members.) Where the heat-treatable aluminum alloy members in which the GP zones are extinguished are butted to each other and joined by friction stir welding, a stir zone at which the heat-treatable aluminum alloy members are joined or welded together to provide a joined product has a structure similar to that when subjected to a solution heat treatment. The strength or hardness of the stir zone is higher than the strength or hardness of the base material and the strength or hardness of the heat-affected zones. The heat-affected zones have a reversion structure which has undergone slight age-hardening. The strength or hardness of the heat-affected zones is equal to or higher than the strength or hardness of the base material and lower than the strength or hardness of the stir zone. On the other hand, the base material which gives non-welded portions (portions of the joined product excluding a welded region that includes the heat-affected zones) maintains the reversion state or structure and the strength or hardness of the base material is the lowest. As a consequence, even if the joined product is subjected to press forming at a portion thereof including a joint region, it is possible to avoid the conventionally experienced occurrence of fracture at the heat-affected zones due to the stress concentrating locally on the heat-affected zones, permitting the stress to be distributed or dispersed in the base material. Accordingly, the amount of deformation of the joined product is increased, resulting in effectively enhanced breaking elongation or ductility. Thus, the press formability can be advantageously improved.

In a first preferred form of the method according to the above-indicated first aspect, the reversion treatment is a heat treatment in which the heat-treatable aluminum alloys with T4 temper are heated at an elevated temperature of 150-350° C. for a time period of not longer than 300 seconds.

In a second preferred form of the method according to the above-indicated first aspect, each of the heat-treatable aluminum alloy members is formed of a 6000 series aluminum alloy and the reversion treatment is a heat treatment in which the heat-treatable aluminum alloy members with T4 temper are heated at an elevated temperature of 200-350° C. for a time period of not longer than 300 seconds.

In a third preferred form of the method according to the above-indicated first aspect, each of the heat-treatable aluminum alloy members is formed of a 2000 series aluminum alloy and the reversion treatment is a heat treatment in which the heat-treatable aluminum alloy members with T4 temper are heated at an elevated temperature of 150-300° C. for a time period of not longer than 300 seconds.

In a fourth preferred form of the method according to the above-indicated first aspect, each of the heat-treatable aluminum alloy members is formed of a 7000 series aluminum alloy and the reversion treatment is a heat treatment in which the aluminum alloy members with T4 temper are heated at an elevated temperature of 150-250° C. for a time period of not longer than 300 seconds.

According to the second through fourth preferred forms indicated above, the heating conditions of the reversion treatment are precisely determined depending upon the kind of the heat-treatable aluminum alloy members, whereby the relationship in strength among the stir zone, the heat-affected zones and the base material can be further effectively optimized. Therefore, it is possible to more advantageously obtain the joined product with good ductility and good press formability.

In a fifth preferred form of the method according to the above-indicated first aspect, the joining step is carried out on the heat-treatable aluminum alloy members in the reversion state before an increase in tensile strength of the heat-treatable aluminum alloy members due to natural aging exceeds 10 MPa.

According to the fifth preferred form indicated above, the strength or hardness of the base material can be made lower, with high reliability, than the strength or hardness of the stir zone and the strength or hardness of the heat-affected zones.

In a sixth preferred form of the method according to the above-indicated first aspect, the reversion treatment is performed using a heating means selected from a salt bath, an oil bath, an air-heating furnace, an iron, infrared heating and induction heating.

According to the sixth preferred form indicated above, the heat treatment with the intended conditions can be advantageously practiced.

In a seventh preferred form of the method according to the above-indicated first aspect, the reversion-treatment-performing step is carried out such that the reversion treatment is sequentially performed using a suitable heating device along portions of the heat-treatable alloy members at which they are to be joined together by friction stir welding and the joining step is carried out such that the portions which have been subjected to the reversion treatment are sequentially joined together by friction stir welding.

According to the seventh preferred form indicated above, on the pair of heat-treatable aluminum alloy members to be joined, the operation of performing the reversion treatment and the operation of friction stir welding are not carried out separately at separate locations, but are carried out sequentially and continuously on the same line. Therefore, the joined product with excellent press formability can be continuously and efficiently produced. Moreover, because the aluminum alloy members which have been subjected to the reversion treatment are free from age-hardening due to natural aging which occurs before the operation of friction stir welding is initiated. Therefore, the strength or hardness of the base material can be made lower with higher reliability than the strength or hardness of the stir zone and the strength or hardness of the base material.

In the method according to the second aspect, the reversion-treatment-performing step is carried out after the joining step so as to perform the reversion treatment on the joined product obtained in the joining step, before GP zones are formed at a stir zone of the joined product.

According to the method according to the second aspect indicated above, the heat-treatable aluminum alloy members which have been subjected to the T4 treatment are joined together by friction stir welding to provide a joined product, and then the reversion treatment is performed on the joined product. Accordingly, the base material of the joined product with T4 temper is reverted, namely, the GP zones (or clusters) which are formed in the metal structure of the base material (in T4 temper) and which are fine phases of several atoms are temporarily extinguished, whereby the strength or hardness of the base material can be effectively lowered. On the other hand, the stir zone having, owing to the friction stir welding, a metal structure similar to that when subjected to a solution heat treatment maintains the metal structure even after the reversion treatment. The strength or hardness of the stir zone is higher than the strength or hardness of the base material and the strength or hardness of the heat-affected zones. The heat-affected zones placed in a reversion state by the friction stir welding has a reversion structure which has undergone slight age-hardening by the subsequent reversion treatment. The strength or hardness of the heat-affected zones is equal to or higher than the strength or hardness of the base material and lower than the strength or hardness of the stir zone. As a result, even if the joined product is subjected to press forming at a portion thereof including a joint region, it is possible to avoid the conventionally experienced occurrence of fracture at the heat-affected zones due to the stress concentrating locally on the heat-affected zones, permitting the stress to be distributed or dispersed in the base material. Accordingly, the amount of deformation of the joined product is increased, resulting in effectively enhanced breaking elongation and ductility. Thus, the press formability can be advantageously improved.

In a first preferred form of the method according to the above-indicated second aspect, the reversion treatment is a heat treatment in which the joined product is heated at an elevated temperature of 150-350° C. for a time period of not longer than 300 seconds.

In a second preferred form of the method according to the above-indicated second aspect, each of the heat-treatable aluminum alloy members is formed of a 6000 series aluminum alloy and the reversion treatment is a heat treatment in which the heat-treatable aluminum alloy members are heated at an elevated temperature of 200-350° C. for a time period of not longer than 300 seconds.

In a third preferred form of the method according to the above-indicated second aspect, each of the heat-treatable aluminum alloy members is formed of a 2000 series aluminum alloy and the reversion treatment is a heat treatment in which the heat-treatable aluminum alloy members are heated at an elevated temperature of 150-300° C. for a time period of not longer than 300 seconds.

In a fourth preferred form of the method according to the above-indicated second aspect, each of the heat-treatable aluminum alloy members is formed of a 7000 series aluminum alloy and the reversion treatment is a heat treatment in which the heat-treatable aluminum alloy members are heated at an elevated temperature of 150-250° C. for a time period of not longer than 300 seconds.

According to the second through fourth preferred forms indicated above, the heating conditions of the reversion treatment are precisely determined depending upon the kind of the heat-treatable aluminum alloy members, whereby the relationship in strength among the stir zone, the heat-affected zones and the base material can be further effectively optimized. Therefore, it is possible to more advantageously obtain the joined product with good ductility and good press formability.

In a fifth preferred form of the method according to the above-indicated second aspect, the reversion-treatment-performing step is carried out on the joined product obtained in the joining step before a time period during which the joined product undergoes natural aging that occurs after the heat-treatable aluminum alloy members have been joined by friction stir welding exceeds 24 hours.

According to the fifth preferred form indicated above, the strength or hardness of the base material can be made lower, with high reliability, than the strength or hardness of the stir zone and the strength or hardness of the heat-affected zones.

In a sixth preferred form of the method according to the above-indicated second aspect, the reversion treatment is performed using a heating means selected from a salt bath, an oil bath, an air-heating furnace, an iron, infrared heating and induction heating.

According to the sixth preferred form indicated above, the heat treatment with the intended conditions can be advantageously practiced.

In an seventh preferred form of the method according to the above-indicated second aspect, the joining step is carried out such that the heat-treatable alloy members are joined together sequentially along portions thereof at which they are to be joined by friction stir welding and the reversion-treatment-performing step is carried out such that the reversion treatment is sequentially performed, using a suitable heating device, on the joined product which at least includes a stir zone formed by friction stir welding in the joining step.

According to the seventh preferred form indicated above, on the pair of heat-treatable aluminum alloy members to be joined, the operation of friction stir welding and the operation of performing the reversion treatment are not carried out separately at separate locations, but are carried out sequentially and continuously on the same line. Therefore, the joined product with excellent press formability can be continuously and efficiently produced. Moreover, because the joined product obtained after the operation of friction stir welding does not suffer from age-hardening due to natural aging which occurs before the reversion treatment is initiated. Therefore, the strength or hardness of the base material can be made lower, with higher reliability, than the strength or hardness of the stir zone and the strength or hardness of the base material.

To attain the above-indicated object, the present invention provides a joined product for press forming obtained by a method of joining heat-treatable aluminum alloy members by friction stir welding, comprising the steps of: (a) a T4-treatment-performing step of performing a T4 treatment on heat-treatable aluminum alloy members so as to impart T4 temper to the heat-treatable aluminum alloy members; (b) a joining step of joining the heat-treatable aluminum alloy members with the T4 temper by friction stir welding to provide a joined product; and (c) a reversion-treatment-performing step of performing a reversion treatment, the reversion-treatment-performing step being carried out prior to or after the joining step.

The joined product for press forming constructed as described above is produced according to any of the methods described above. Accordingly, it is possible to avoid occurrence of fracture at the heat-affected zones in press forming, resulting in an increased amount of deformation of the joined product. Consequently, the joined product assures a high degree of freedom in the configuration of a press product to be obtained and a larger deformation amount in press forming.

To attain the above-indicated object, the present invention provides a joined product for press forming with excellent ductility obtained by joining heat-treatable aluminum alloy members which have been subjected to a T3 treatment or a T4 treatment, wherein a joint region of the joined product at which the heat-treatable aluminum alloy members are joined together being formed such that hardness of the joint region and a heat-affected zone located adjacent to the joint region is held in a range of 100-200 where hardness of base material portions of the joined product is 100.

The joined product indicated above is advantageously produced, for instance, according to any of the methods described above. In the joined product, the relationship in strength among the joint region, the heat-affected zones and the base material is optimized, resulting in improved ductility and formability. In addition, it is possible to increase the hardness of the joined product by performing a heat treatment such as bake hardening after it has been subjected to a forming operation.

In the joined product indicated above, a total width of the joint region and the heat-affected zones on a surface of the joined product is preferably held in a range of 1 mm to 100 mm.

Preferably, in the joined product indicated above, fracture occurs at the base material portions in a case where a tensile test is conducted using a rectangular specimen defined in ASTM B 557-94 that is obtained from the joined product such that the specimen includes, as a parallel portion thereof, the joint region and the heat-affected zones.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

Figure 1:
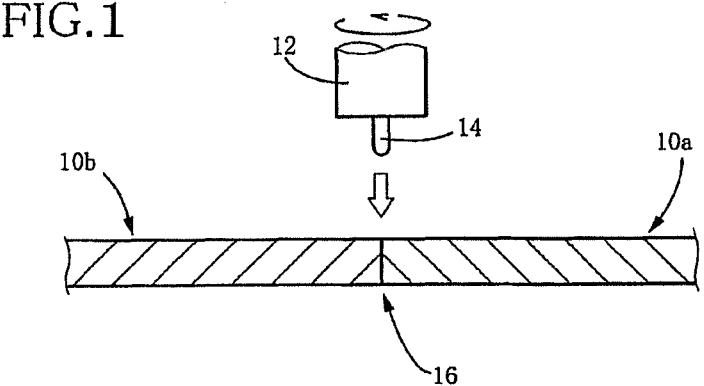
FIG. 1 is a cross-sectional view showing one example of a process of joining heat-treatable aluminum (Al) alloy members by friction stir welding, the view showing a state in which the Al alloy members are butted to each other before welding.

In the present method of joining heat-treatable aluminum alloy members (heat-treatable Al alloy members) by friction stir welding, the heat-treatable Al alloy members are made of known heat-treatable aluminum alloys whose hardness can be increased by an age-hardening treatment such as those specified in The International Designation System for Wrought Aluminum and Wrought Aluminum Alloys and including a 6000 series aluminum alloy (Al—Mg—Si series), a 2000 series aluminum alloy (Al—Cu—Mg series), and a 7000 series aluminum alloy (Al—Zn—Mg series). More specifically described, examples of the 6000 series aluminum alloy include an AA 6061 alloy, an AA 6063 alloy or the like with a small Si content and an AA 6016 alloy, an AA 6111 alloy or the like with a large Si content. Examples of the 2000 aluminum alloy include an AA 2014 alloy, an AA 2017 alloy, an AA 2024 alloy and the like. Examples of the 7000 series aluminum alloy include an AA 7075 alloy, an AA 7003 alloy and the like.

The heat-treatable Al alloy members may have any shape such as a plate-like shape, a pipe-like shape or a bar-like shape produced by a known method such as rolling, extrusion or casting, as long as end portions of respective heat-treatable Al alloy members at which the members are to be joined together can be butted to each other. Generally, the plate-like members or the extruded members are suitably used.

In particular, a plate-like rolled member is produced as follows, for instance: Initially, an aluminum alloy having a predetermined chemical composition is cast into an ingot according to an ordinary direct chill casting method. After the obtained cast ingot has been subjected to a homogenization heat treatment, hot rolling is performed, thereby producing a hot-rolled plate. Alternatively, a molten metal of an aluminum alloy having a predetermined chemical composition is formed directly into a continuous cast plate according to a continuous casting method (strip casting method). The hot-rolled plate or the continuous cast plate is subsequently subjected to cold rolling, so that a planar plate member with a predetermined thickness is produced. Before or during the cold rolling, an intermediate annealing treatment may be performed as needed.

A plurality of heat-treatable Al alloy members each as the plate member, the extruded member or the like described above are joined together by friction stir welding. In the present invention, a T4 treatment is initially performed on those heat-treatable Al alloy members. In other words, the heat-treatable Al alloy members are subjected to a solution heat treatment and subsequent quenching, and then naturally aged, so that the heat-treatable aluminum alloy members with T4 temper are obtained. Particularly when the 6000 series aluminum alloy is used, pre-aging at a temperature of 40-120° C. for a time period within 24 hours may be performed as needed after the quenching, for the purpose of imparting bake hardenability to the heat-treatable Al alloy members.

In the present method, the thus obtained T4 temper heat-treatable Al alloy members are joined by friction stir welding before or after performing a reversion treatment. There will be first explained a first arrangement in which the heat-treatable Al alloy members are joined after the reversion treatment has been performed.

The reversion treatment is a treatment for temporality extinguishing the GP zones (clusters) formed in the metal structure of the T4 temper heat-treatable Al alloy members as a result of natural aging. In the present invention, the reversion treatment is performed by carrying out a heat treatment in which the T4 temper heat-treatable Al alloy members are heated at an elevated temperature of 150-300° C. and held at the temperature for a time period of not longer than 300 seconds, preferably not longer than 60 seconds. The lower limit of the holding time is not particularly limited. The temperature may be lowered immediately after reaching the desired level.

In the reversion treatment mentioned above, where the heat treatment temperature (the reversion treatment temperature) is lower than 150° C., the GP zones (clusters) are not sufficiently extinguished, namely, the reversion is insufficient, so that the strength or hardness of the base material cannot be effectively lowered. On the contrary, the heat treating temperature exceeding 350° C. causes overaging, leading to coarsening of precipitates formed in the metal structure. In this case, the reversion structure is not obtained. Further, if the holding time at the heat treatment temperature is excessively long, age hardening may be caused after the reversion or softening may be caused due to overaging although the metal structure is reverted. In this case, the intended reversion structure is not obtained.

Preferably, the heat treatment temperature (the reversion treatment temperature) is precisely set depending upon the kind of the Al alloy for the heat-treatable Al members to be joined. For instance, where the heat-treatable Al alloy members are made of the 6000 series aluminum alloy, the heat treatment temperature is preferably held in a range of 200-350° C., more preferably in a range of 200-300° C. Where the heat-treatable Al alloy members is made of the 2000 series aluminum alloy, the heat treatment temperature is preferably held in a range of 150-300° C., more preferably in a range of 180-300° C. Where the heat-treatable Al alloy members is made of the 7000 series aluminum alloy, the heat treatment temperature is preferably held in a range of 150-250° C., more preferably in a range of 170-250° C.

In raising the temperature for heating the heat-treatable Al alloy members to an intended level and lowering the temperature from that level, the temperature raising rate and the temperature lowering rate are not particularly limited, but preferably set to be not less than 2° C./second, more preferably, in a range from 4° C./second to 50° C./second, for effectively establishing the reversion explained above.

As a result of the predetermined heat treatment performed as described above, the GP zones (clusters) formed in the metal structure of the heat-treatable Al alloy members with T4 temper is temporarily extinguished, so that the Al alloy members have the reversion structure. Accordingly, the heat-treatable Al alloy members placed in the reversion state after the reversion treatment have lowered strength or hardness as a whole.

In the method according to the first arrangement, the subsequent friction stir welding process is performed on the heat-treatable Al alloy members whose strength or hardness has been lowered by the reversion treatment. However, in the heat-treatable Al alloy members in the reversion state whose strength or hardness has been lowered by the reversion treatment, the GP zones (clusters) will be re-formed in the metal structure due to natural aging, so that the strength or hardness will be increased. In view of this, the joining operation by friction stir welding is preferably carried out while the heat-treatable Al alloy members are kept in the reversion state in which the strength or hardness of the Al alloy members is not excessively increased due to natural aging, in other words, before the GP zones are substantially re-formed. More specifically explained, the joining operation by friction stir welding is preferably carried out before an increase in tensile strength of the heat-treatable Al alloy members, namely, a difference between tensile strength of the heat-treatable Al alloy members upon joining by friction stir welding and tensile strength thereof after the reversion treatment exceeds 10 MPa, preferably 5 MPa. This is because the strength or hardness of the base material undesirably becomes higher than that of the heat-affected zones after the friction stir welding if the increase in the tensile strength due to the age hardening exceeds 10 MPa. In this case, it is difficult to obtain the intended strength relationship. Here, "tensile strength" is one measured in accordance with "Standard Test Methods of Tension Testing Wrought and Cast Aluminum and Magnesium Alloy Products" specified in ASTM B 557-94.

In the light of the above, where the heat-treatable Al alloy members are stored at 20° C., it is preferable to carry out the friction stir welding process within about 60 days after the reversion treatment for the heat-treatable Al alloy members formed of the 6000 series aluminum alloy and within about 20 days after the reversion treatment for the heat-treatable Al alloy members formed of the 2000 series aluminum alloy or the 7000 series aluminum alloy. The higher the storage temperature, the faster the age hardening proceeds. Accordingly, where the heat-treatable Al alloy members formed of the AA 6000 series aluminum alloy are stored at 40° C., it is preferable to carry out the friction stir welding process within one week or two weeks after the reversion treatment. Namely, it is important to carry out the friction stir welding before the tensile strength becomes excessively large, in other words, before the effect of the reversion treatment is not lost.

For forming the intended joined product by joining together the heat-treatable Al alloy members in the reversion state by friction stir welding, a known method may be employed. For instance, initially, two heat-treatable Al alloy members 10a, 10b as show in FIG. 1 (each in the form of a plate in this arrangement) are butted to each other, and these two Al alloy members are prevented, in a known manner, from moving relative to each other in the longitudinal direction (the welding direction) and the widthwise direction thereof. Subsequently, a rotary tool 12 is rotated about its axis at a high speed together with a pin 14, and the rotary tool 12 and the pin 14 are moved relative to a butted portion 16 of the two heat-treatable Al alloy members 10a, 10b along the same 16 in a direction perpendicular to the sheet plane of FIG. 1 with the pin 14 inserted in the butted portion 16, whereby the two heat-treatable Al alloy members 10a, 10b are joined together by friction stir welding at the butted portion 16. In this connection, the rotary tool 12 and the pin 14 may be moved along the butted portion 16 or the two heat-treatable Al alloy members 10a, 10b which are prevented from moving relative to each other (i.e., which are bound to each other) may be moved.

Figure 2:
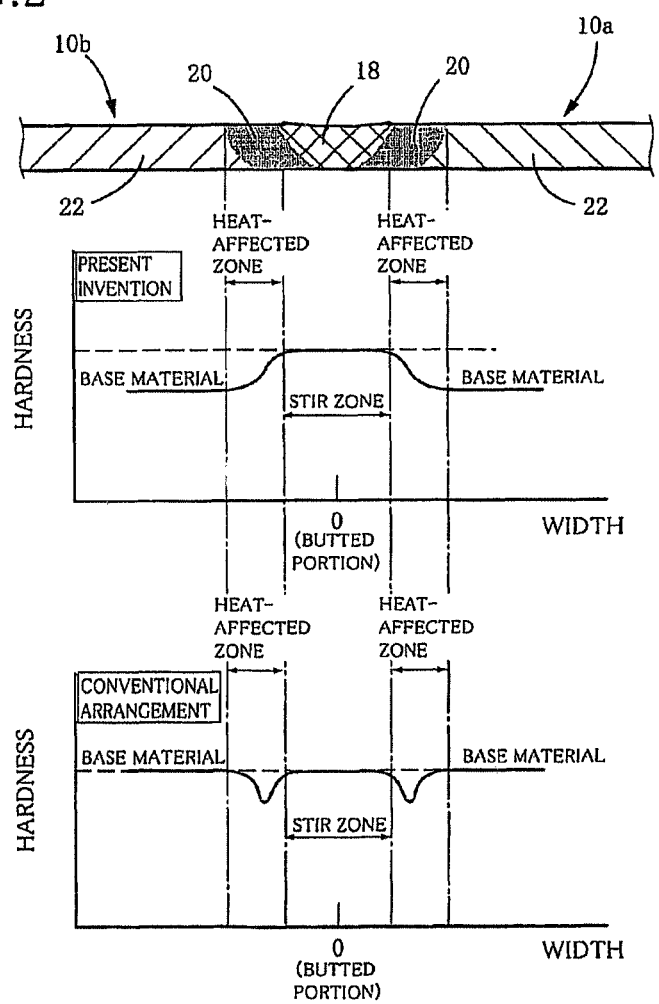
FIG. 2 are views for explaining relationship in hardness among a stir zone, heat-affected zones and a base material of a joined product obtained by friction stir welding, the views including: a cross sectional view showing planar heat-treatable Al alloy members which have been joined by friction stir welding; a graph showing hardness distribution of a joined product on which the reversion treatment has been performed before or after the friction stir welding according to the present invention; and a graph showing hardness distribution of a conventional joined product on which only the friction stir welding has been performed without performing the reversion treatment, the graphs being related to the cross sectional view of the joined Al alloy members.

After the friction stir welding operation, there is formed, at the butted portion 16 at which the two heat-treatable Al alloy members 10a, 10b are butted to each other, a stir zone 18 as shown in the cross sectional view of the upper part of FIG. 2 bridging the two Al alloy members 10a, 10b and extending continuously in the longitudinal direction (i.e., in a direction perpendicular to the sheet plane of FIG. 2). Further, in the vicinity of and adjacent to the stir zone 18, there exist heat-affected zones 20 (HAZ portions) affected by the heat in the friction stir welding operation.

In a conventional arrangement, the heat-affected zones 20 have the lowest hardness as shown in the lower graph of FIG. 2. In contrast, since the reversion treatment is performed prior to the friction stir welding operation in the present arrangement, the stir zone 18 has a structure similar to that when subjected to a solution heat treatment and its hardness is larger than those of base material portions 22 and the heat-affected zones 20, as shown in the upper graph of FIG. 2. More specifically explained, the temperature of the stir zone 18 reaches 450° C. or higher, so that alloy components such as Si, Mg, Cu and the like that constitute the cluster are solubilized. Accordingly, the rate of hardening of the stir zone 18 due to natural aging after the welding is efficiently increased as compared with those of the base material portions 22 and the heat-affected zones 20, whereby the stir zone 18 has the highest hardness. The heat-affected zones 20 do not suffer from softening even subjected to the heat and have the reversion structure which has undergone slight age-hardening. The hardness of the heat-affected zones 20 is lower than that of the stir zone 18 and is equal to or higher than that of the base material portions 22. The base material portions 22 which are not influenced by the heat of the friction stir welding maintain the reversion structure and have the lowest hardness. Consequently, the distribution of the strength of the joined product in a direction perpendicular to the welding direction assumes a trapezoidal shape shown in the upper graph of FIG. 2 in which the strength increases from the base material portions 22 located on the opposite sides of the stir zone 18 toward the central stir zone 18 (the butted portion 16).

In contrast, in a case where the reversion treatment is not carried out, the stir zone 18 has, after the friction stir welding, a structure similar to that when subjected to the solution heat treatment and its hardness is generally equal to or slightly lower than that of the base material portions 22 with T4 temper, as shown in the lower graph of FIG. 2. In the meantime, the heat-affected zones 20 have the metal structure in the reversion state and the hardness thereof is the lowest. Therefore, upon application of a stress to such a joined product, the stress concentrates on the heat-affected zones 20 having the lowest hardness, so that the heat-affected zones 20 tend to easily deform faster than the other portions of the joined product, undesirably causing fracture or breakage.

The study made by the inventors of the present invention revealed that the hardness distribution with the trapezoidal shape shown in the upper graph of FIG. 2 is not obtained even if the heat-treatable Al alloy members having the reversion structure as a result of implementation of the reversion treatment are joined by fusion welding such as the TIG welding, the MIG welding and the like, and it was observed that the heat-affected zones had the lowest hardness. Moreover, because the welded region and a part of the heat-affected zones adjacent to the welded region are once melted, the cast structure is altered or deteriorated, resulting in lowered ductility.

In the first arrangement explained above wherein the friction stir welding operation is performed on the heat-treatable Al alloy members placed in the reversion state, the relationship in strength among the stir zone 18, the heat-affected zones 20 and the base material portions 22 can be optimized, thereby advantageously providing the joined product in which the base material portions 22 have the lowest hardness. Therefore, even upon application of a stress to the joined product, it is possible to effectively prevent the stress from concentrating on the heat-affected zones 20, whereby the stress is distributed at the entirety of the base material portions 22. Thus, the overall deformation amount of the joined product is advantageously increased, making it possible to perform press forming with a high degree of freedom in the configuration of the press product to be obtained and with a larger deformation amount. In other words, the press formability of the joined product can be considerably effectively enhanced.

The thus obtained joined product having excellent press formability is advantageously used as a blank for press forming operation, for instance, and used as shell members of vessels, vehicles, aircrafts and the like, floors, building materials, heat exchangers, antennas, vehicle components, bridges and the like, after the joined product has been subjected to the press forming operation.

The heating system in the reversion treatment performed prior to the friction stir welding is not particularly limited, but any heating means known in the art may be employed. For instance, where the step of performing the reversion treatment and the step of performing the friction stir welding operation are carried out discontinuously, e.g., where any one of the steps is carried out separately from a line to which the other of the steps belongs, a heating means for performing the heat treatment is preferably selected from a salt bath, an oil bath, an air-heating furnace, an iron, infrared heating and induction heating, from the viewpoint of equipment and cost.

Figure 3:
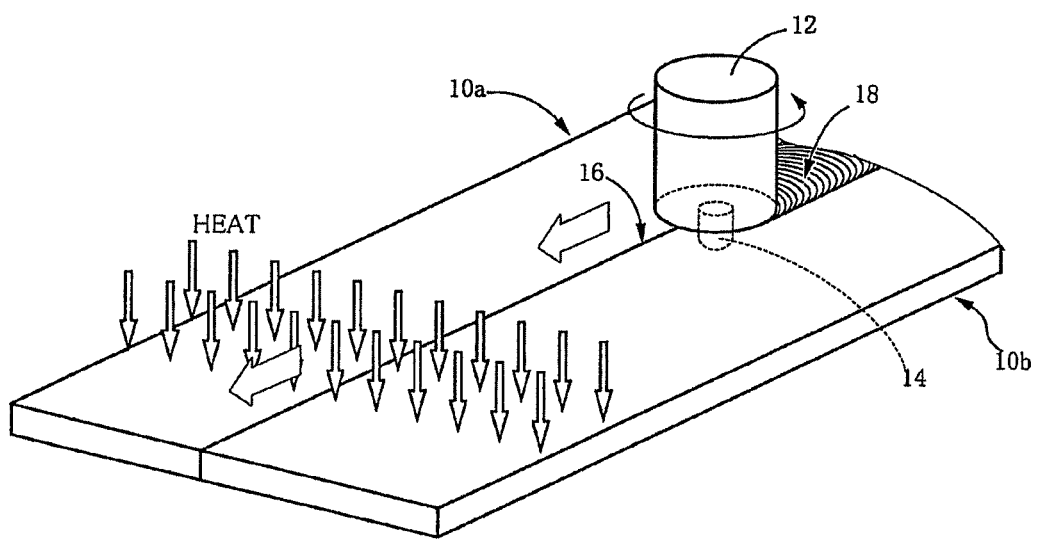
FIG. 3 is a view for explaining one example of a process of performing the operation of reversion treatment and the operation of friction stir welding continuously in order on the same line.

In the present arrangement, the reversion treatment and the friction stir welding operation may be carried out continuously on the same line. Where the reversion treatment and the friction stir welding operation are carried out on the same line, for instance, the aforementioned reversion treatment (heat treatment) is performed sequentially along the butted portion 16 of the two heat-treatable Al alloy members 10a, 10b at which the two members 10a, 10b are welded, over a sufficiently large area ranging from the butted portion 16 to the base material portions 22 in a widthwise direction of the two members 10a, 10b (that is perpendicular of the welding direction), preferably, over an entire area in the widthwise direction, while the friction stir welding operation is performed sequentially on the butted portion 16 which has been subjected to the reversion treatment, as shown in FIG. 3. Where the reversion treatment and the friction stir welding are continuously carried out on the same line, it is preferable to employ, as the heating means, infrared heating, induction heating, laser heating, gas flame heating, or the like. In this instance, the reversion treatment (heat treatment) needs to be performed not only on the butted portion 16 and its vicinity, but also over a large area in the widthwise direction of the heat-treatable Al alloy members, for assuring a large deformation amount by permitting the stress to be applied upon working operation to be effectively distributed over the base material portions.

In the illustrated first arrangement, the planar heat-treatable Al alloy members 10a, 10b having the same thickness and formed of the same kind of heat-treatable Al alloy are joined together. The heat-treatable Al alloy members having mutually different thickness or formed of different kinds of Al alloy may be joined together. Where the heat-treatable Al alloy members having mutually different thickness are joined, the reversion treatment may be performed on both of a thin Al alloy member and a thick Al alloy member or only on the thin Al alloy member. Namely, the aforementioned T4 treatment, reversion treatment and friction stir welding operation may be sequentially performed such that a portion whose strength or hardness becomes the lowest after welding corresponds to a base material portion of one of the two heat-treatable Al alloy members to be joined.

Next, there will be explained a second arrangement in which the heat-treatable Al alloy members are joined before the reversion treatment is performed. Described more specifically, the T4-treated heat-treatable Al alloy members are joined together by friction stir welding in a known manner, thereby providing a joined product. Because the manner in which the T4-treated heat-treatable Al alloy members are joined by friction stir welding has been explained above with respect to the illustrated first arrangement referring to FIGS. 1 and 2, a detailed explanation of which is not given here. As in the illustrated first arrangement, after the friction stir welding operation, there is formed, at the butted portion 16 at which the two heat-treatable Al alloy members 10a, 10b are butted to each other, a stir zone 18 as shown in the cross sectional view of the upper part of FIG. 2 bridging the two Al alloy members 10a, 10b and extending continuously in the longitudinal direction (i.e., in a direction perpendicular to the sheet plane of FIG. 2). In this second arrangement, as a result of the friction stir welding, the temperature of the stir zone 18 reaches 450° C. or higher, so that substances such as Si, Mg, Cu, Zn and the like that contribute to the strength and alloy components that form the GP zones (clusters) are solubilized. Accordingly, the stir zone 18 has a structure similar to that when subjected to a solution heat treatment in which the GP zones (clusters) are not present, i.e., a so-called solutionized structure, and the hardness of the stir zone 18 temporarily becomes the lowest. In the vicinity of and adjacent to the stir zone 18, there exist the heat-affected zones 20 (i.e., HAZ) affected by the heat of the friction stir welding so as to be placed in a reversion state. The hardness of the heat-affected zones 20 is lower than that of the base material. In the meantime, the base material portions 22 which are not influenced by the heat of the friction stir welding maintains the T4 temper and has the highest hardness.

In the second arrangement, with the metal structure immediately after the friction stir welding substantially maintained (i.e., the solutionized structure of the stir zone 18, the reversion structure of the heat-affected zones and the T4 temper state of the base material portions 22), the reversion treatment is subsequently carried out. As explained above with respect to the illustrated first arrangement, the reversion treatment is for temporality extinguishing the GP zones (clusters) formed in the metal structure of the T4-treated heat-treatable Al alloy members as a result of natural aging. The reversion treatment is performed by carrying out a heat treatment in which the joined product obtained by joining the T4-treated heat-treatable Al alloy members by friction stir welding are heated at an elevated temperature of 150-300° C. and held at the temperature for a time period of not longer than 300 seconds, preferably not longer than 60 seconds. The lower limit of the holding time is not particularly limited. The temperature may be lowered immediately after reaching the desired level.

The heat treatment temperature (the reversion treatment temperature) lower than 150° C. or higher than 350° C. and the excessively long holding time at the heat treatment temperature will cause the disadvantages described above with respect to the illustrated first arrangement. As in the illustrated first arrangement, the heat treatment temperature (the reversion treatment temperature) may be precisely set depending upon the kind of the heat-treatable aluminum alloy used for providing the heat-treatable Al alloy members. Further, in raising the temperature for heat treating the joined product obtained to an intended level and lowering the temperature from that level, the temperature raising rate and the temperature lowering rate are not particularly limited, but preferably set to be not less than 2° C./second, more preferably, in a range from 4° C./second to 50° C./second, for effectively establishing the reversion explained above, as in the illustrated first arrangement.

In this second arrangement, the reversion treatment explained above is carried out after the friction stir welding operation has been carried out. In this respect, the metal structure of the joined product obtained by the friction stir welding changes with a lapse of time, so that the strength or hardness of the joined product changes. Therefore, it is desirable to perform the reversion treatment before the metal structure largely changes, in other words, before the GP zones (clusters) are formed in the metal structure of the stir zone 18 having the solutionized structure in which the rate of natural aging is high. More specifically described, it is preferable to carry out the reversion treatment before a time period during which the joined product is held at room temperature after the friction stir welding exceeds 24 hours, preferably 6 hours. If the time period between the completion of the friction stir welding and the initiation of the reversion treatment is too long, the GP zones (clusters) are undesirably formed in the metal structures of the stir zone 18 and the heat-affected zones 20 due to natural aging. Even if the reversion treatment is performed on the joined product having such a metal structure, it is not possible to attain the hardness distribution of the trapezoidal shape shown in the upper graph of FIG. 2 explained above with respect to the illustrated first arrangement and the strength or hardness of the stir zone 18 and the strength or hardness of the heat-affected zones 20 become equal to or slightly smaller than that of the base material. Consequently, fracture is likely to occur at the stir zone 18 and the heat-affected zones 20, especially at the heat-affected zones 20.

The heating system in the reversion treatment to be performed after the friction stir welding is not particularly limited, but any heating means known in the art may be employed. For instance, where the step of performing the friction stir welding operation and the step of performing the reversion treatment are carried out discontinuously, e.g., where any one of the steps is carried out separately from a line to which the other of the steps belongs, a heating means for performing the heat treatment is preferably selected from a salt bath, an oil bath, an air-heating furnace, an iron, infrared heating and induction heating, from the viewpoint of equipment and cost.

Figure 4:
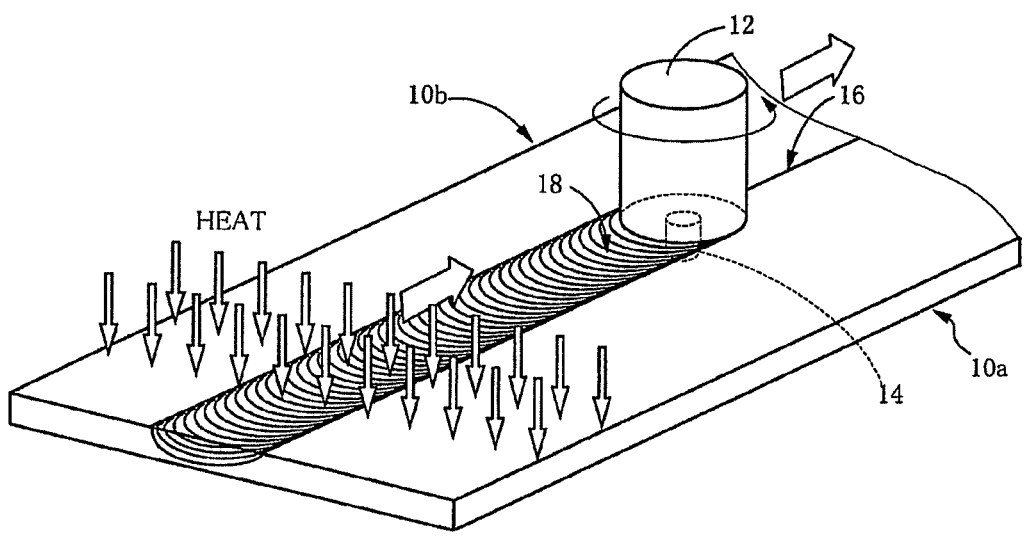
FIG. 4 is a view for explaining one example of a process of performing the operation of friction stir welding and the operation of reversion treatment continuously in order on the same line.

In the present arrangement, the friction stir welding operation and the reversion treatment may be carried out continuously on the same line. Where the friction stir welding operation and the reversion treatment are carried out on the same line, the friction stir welding operation is performed sequentially along the butted portion 16 at which the heat-treatable Al alloy members 10*a*, 10*b* are to be joined together, while the reversion treatment is performed sequentially on the joined product over a sufficiently large area ranging from the stir zone 18, the heat-affected zones 20, to the base material portions 22 in a widthwise direction of the joined product (that is perpendicular of the welding direction), preferably, over an entire area in the widthwise direction, as shown in FIG. 4. Where the friction stir welding operation and the reversion treatment are continuously carried out on the same line, it is preferable to employ, as the heating means, infrared heating, induction heating, laser heating, gas flame heating or the like. In this instance, the reversion treatment (the heat treatment) needs to be performed not only on the stir zone 18 and its vicinity, but also over a large area in the widthwise direction of the joined product, for assuring a large deformation amount by permitting the stress to be applied upon working operation to be effectively distributed over the base material portions.

As a consequence of the suitable heat treatment (reversion treatment) performed on the joined product as mentioned above, the GP zones (clusters) formed in the metal structure of the base material portions 22 are temporarily extinguished, so that the base material portions 22 have the reversion structure and the strength or hardness of the base material portions 22 is advantageously lowered. In the meantime, the stir zone 18 maintains the solutionized structure in which no GP zones (clusters) exist while the heat-affected zones 20 have the reversion structure which has undergone slight age-hardening. Where the joined product in such a metal structure state is naturally aged at room temperature, the hardness becomes the highest at the stir zone 18 owing to a high rate of age-hardening. The hardness of the heat-affected zones 20 is lower than that of the stir zone 18 and equal to or higher than that of the base material portions 22. The hardness of the base material portions 22 is lower than those of the stir zone 18 and the heat-affected zones 20. Consequently, the joined product according to the second arrangement has a hardness distribution in a direction perpendicular to the welding direction assumes a trapezoidal shape in which the hardness increases from the base material portions 22 located on the opposite sides of the stir zone 18 toward the central stir zone 18, as shown in the upper graph of FIG. 2.

In the second arrangement explained above wherein the reversion treatment is performed on the joined product obtained by friction stir welding the T4 temper heat-treatable Al alloy members, the relationship in strength among the stir zone 18, the heat-affected zones 20 and the base material portions 22 can be optimized, thereby advantageously providing the joined product in which the base material portions 22 have the lowest hardness. Therefore, even upon application of a stress to the joined product, it is possible to effectively prevent the stress from concentrating on the heat-affected zones 20, whereby the stress is distributed on the entirety of the base material portions 22. Thus, the overall deformation amount of the joined product is advantageously increased, making it possible to perform press forming with a high degree of freedom in the configuration of the press product to be obtained and with a larger deformation amount. In other words, the press formability of the joined product can be considerably effectively enhanced. Since the thus obtained joined product has excellent press formability, it is advantageously used as a blank in press forming for various applications mentioned above with respect to the illustrated first arrangement.

Where the aforementioned reversion treatment is not carried out, the stir zone 18 has a structure similar to that when subjected to the solution heat treatment and its hardness after natural aging is generally equal to or slightly lower than that of the base material portions 22 with T4 temper, as shown in the lower graph of FIG. 2. In the meantime, the heat-affected zones 20 have the metal structure in the reversion state and the hardness thereof is the lowest. Therefore, upon application of a stress to such a joined product, the stress concentrates on the heat-affected zones 20 having the lowest hardness, so that the heat-affected zones 20 tend to easily deform faster than the other portions of the joined product, undesirably causing fracture or breakage. The study made by the inventors of the present invention revealed the following: In a case even where the aforementioned reversion treatment is performed on the T4 temper joined product obtained by fusion welding such as the TIG welding, the MIG welding and the like, the welded region and the heat-affected zones located adjacent to the welded region are once molten, whereby the cast structure is altered or deteriorated and the ductility is lowered. Therefore, it was observed that the hardness distribution with the trapezoidal shape shown in the upper graph of FIG. 2 was not obtained and the hardness is the lowest at the heat-affected zones.

In the illustrated second arrangement, the planar heat-treatable Al alloy members 10*a*, 10*b* having the same thickness and formed of the same kind of heat-treatable Al alloy are joined together. The heat-treatable Al alloy members having mutually different thickness or formed of different kinds of Al alloy may be joined together.

While preferred embodiments of the present invention have been described in detail by reference to the accompanying drawings, it is to be understood that the present invention may be embodied with various changes and modifications that may occur to those skilled in the art, without departing from a scope of the invention defined in attached claims.

EXAMPLES

To further clarify the present invention, some examples of the present invention will be described. It is to be understood that the present invention is not limited to the details of these examples and the foregoing description.

Example 1

Ten aluminum alloys A-J having respective chemical compositions shown in the following TABLE 1 were cast into ingots according to a DC casting method in an ordinary manner. The obtained cast ingots were then subjected to homogenization, hot rolling and cold rolling, thereby providing aluminum alloy plate members each having thickness of 1.0 mm. Subsequently, the aluminum alloy plate members were subjected to a solution heat treatment and quenching into water, and then naturally aged at room temperature for ten days. Thus, there were obtained T4 temper members.

TABLE 1

| Alloy | Si | Fe | Cu | Mn | Mg | Cr | Zn | Ti | Al | Series of alloy |
|---|---|---|---|---|---|---|---|---|---|---|
| A | 0.6 | 0.32 | 4.5 | 0.8 | 0.42 | 0.02 | 0.09 | 0.04 | balance | 2000 |
| B | 0.5 | 0.28 | 4.3 | 0.6 | 0.6 | 0.02 | 0.07 | 0.03 | balance | 2000 |
| C | 0.12 | 0.18 | 4.5 | 0.6 | 1.5 | 0.01 | 0.02 | 0.02 | balance | 2000 |
| D | 0.42 | 0.15 | 0.03 | 0.06 | 0.5 | 0.02 | 0.03 | 0.03 | balance | 6000 |
| E | 0.7 | 0.13 | 0.32 | 0.12 | 1.1 | 0.18 | 0.02 | 0.02 | balance | 6000 |
| F | 1.0 | 0.16 | 0.01 | 0.07 | 0.5 | 0.01 | 0.01 | 0.02 | balance | 6000 |
| G | 1.0 | 0.12 | 0.01 | 0.09 | 0.5 | 0.02 | 0.23 | 0.02 | balance | 6000 |
| H | 1.0 | 0.15 | 0.7 | 0.09 | 0.4 | 0.03 | 0.01 | 0.03 | balance | 6000 |
| I | 0.11 | 0.17 | 0.16 | 0.25 | 1.3 | 0.09 | 4.6 | 0.02 | balance | 7000 |
| J | 0.13 | 0.18 | 1.6 | 0.03 | 2.7 | 0.22 | 5.6 | 0.03 | balance | 7000 |

Subsequently, the thus obtained T4 temper members were subjected to a heat treatment (reversion treatment) under respective conditions indicated in the following TABLE 2 and stored at 20° C. for three days. Two aluminum alloy members formed of each of the alloys A-J and subjected to the reversion treatment were butt-joined by a friction stir welding (FSW) process with their widthwise end portions butted to each other, thereby producing test members 1-10 each as a joined product. It was separately confirmed that, in any of the aluminum alloy members, an increase in tensile strength during a time period after the reversion treatment and before the welding operation was not greater than 10 MPa. In the friction stir welding operation, a rotary tool made of steel was rotated at 1000 rpm and moved horizontally at a speed of 400 mm/minute. The rotary tool was provided at its end with eight grooves each having a depth of 1 mm for the purpose of chipping or scraping.

Thereafter, the test members 1-10 obtained by the friction stir welding were stored at 20° C. for seven days and then subjected to a Vickers hardness test, a tensile test and a formability test explained below. The results of the tests are indicated also in TABLE 2.

Vickers Hardness Test

A test piece was cut from each test member in a direction perpendicular to a welding direction of the test member. Then, the test piece was embedded in a resin and was ground at its cross section in a direction perpendicular to the welding direction. The hardness of the stir zone, heat-affected zones and base material portions was measured using a Vickers hardness tester with a load of 1 kgf according to ASTM E 92.

Tensile Test

A rectangular specimen defined in ASTM B 557-94 was cut from each test member such that the welding direction of the test member is orthogonal to a tensile direction in the tensile test and such that the welded region is located at a middle of the specimen. The tensile test conforming to ASTM B 557-94 was performed on the obtained specimen at room temperature. For each specimen, tensile strength, yield strength and breaking elongation were measured. Further, a position at which fracture or breakage occurred (hereinafter may be referred to as "fractured position") was observed for each specimen.

Formability Test

A circular specimen with a diameter of 120.0 mm was cut from each test member such that the welded region is located at a center of the specimen. After the circular specimen was coated on a surface thereof with a low viscous lubricant, a bulging operation is conducted using an Erichsen tester so as to measure a forming limit height until fracture. The bulging operation was conducted using a hemispherical punch with a diameter of 50 mm at a forming rate of 2 mm/second with the circular specimen fixedly held by a die with a lock bead for preventing a peripheral portion of the specimen from flowing toward a central portion.

TABLE 2

| Test member | Alloy | Heat treatment Temperature (° C.) | Heat treatment Time (second) | Vickers hardness Stir zone | Vickers hardness Heat-affected zones | Vickers hardness Base material | Tensile properties Tensile strength (MPa) | Tensile properties Yield strength (MPa) | Tensile properties Elongation (%) | Fractured position | Forming limit height (mm) |
|---|---|---|---|---|---|---|---|---|---|---|---|
| 1 | A | 250 | 20 | 118 | 115 | 110 | 402 | 295 | 20 | base material | 16.5 |
| 2 | B | 240 | 30 | 120 | 118 | 113 | 413 | 286 | 21 | base material | 16.0 |
| 3 | C | 250 | 30 | 135 | 127 | 125 | 455 | 337 | 20 | base material | 15.7 |
| 4 | D | 220 | 10 | 59 | 53 | 50 | 185 | 83 | 24 | base material | 15.2 |
| 5 | E | 270 | 20 | 74 | 71 | 66 | 235 | 125 | 22 | base material | 16.0 |
| 6 | F | 250 | 5 | 67 | 64 | 60 | 218 | 122 | 24 | base material | 17.0 |
| 7 | G | 250 | 10 | 69 | 65 | 62 | 220 | 123 | 25 | base material | 17.1 |
| 8 | H | 270 | 20 | 76 | 74 | 70 | 253 | 135 | 23 | base material | 17.9 |
| 9 | I | 200 | 30 | 114 | 112 | 110 | 355 | 210 | 16 | base material | 15.8 |
| 10 | J | 180 | 20 | 120 | 115 | 113 | 396 | 220 | 17 | base material | 16.2 |

It will be apparent from the above TABLE 2 that, in any of the test members 1-10, the hardness of the base material is the lowest among the stir zone, the heat-affected zones and the base material. It is recognized from the results of the tensile test that, in any of the test members 1-10, fracture occurred not at the heat-affected zones, but at the base material and that all of the test members 1-10 exhibit the breaking elongation of 16% or larger. It is further recognized from the results of the formability test that all of the test members 1-10 have the forming limit height of 15.0 mm or larger. It can be understood from these results that the test members 1-10 on which the reversion treatment was performed according to the present invention exhibit excellent press formability that permits sufficient deformation in press forming.

Comparative Example 1

For comparison, initially, ten aluminum alloys A-J having respective chemical compositions which are the same as those in the above Example 1 were cast into ingots according to a DC casting method in an ordinary manner. The obtained cast ingots were then subjected to homogenization, hot rolling and cold rolling, thereby providing aluminum alloy plate members each having thickness of 1.0 mm. Subsequently, the aluminum alloy plate members were subjected to a solution heat treatment and quenching into water, and then naturally aged at room temperature for ten days. Thus, there were obtained T4 temper members. Without performing the heat treatment (reversion treatment), two aluminum alloy members with T4 temper formed of each of the alloys A-J were butt-joined by the friction stir welding (FSW) process under conditions similar to those in the above Example 1 with their widthwise end portions butted to each other, thereby producing test members 11-20 each as a joined product. Thereafter, the test members 11-20 obtained by the friction stir welding were stored at 20° C. for seven days and then subjected to the Vickers hardness test, the tensile test and the formability test explained above. The results of the tests are indicated also in TABLE 3.

It will be apparent from the results shown in the above TABLE 3 that, in any of the test members 11-20, the Vickers hardness of the heat-affected zones is the lowest among the stir zone, the heat-affected zones and the base material since the reversion treatment was not performed. Further, in any of the test members 11-20, fracture occurred at the heat-affected zones. Moreover, all of the test members 11-20 have smaller values of breaking elongation and smaller values of forming limit height less than 15.0 mm, as compared with the test members 1-10 of the above Example 1 each of which was obtained by joining two aluminum alloy members formed of the same aluminum alloy.

Comparative Example 2

For comparison, initially, ten aluminum alloys A-J having respective chemical compositions which are the same as those in the above Example 1 were cast into ingots according to a DC casting method in an ordinary manner. The obtained cast ingots were then subjected to homogenization, hot rolling and cold rolling, thereby providing aluminum alloy plate members each having thickness of 1.0 mm. Subsequently, the aluminum alloy plate members were subjected to a solution heat treatment and quenching into water, and then naturally aged at room temperature for ten days. Thus, there were obtained T4 temper members. Subsequently, the thus obtained T4 temper members were subjected to a heat treatment under respective conditions indicated in the following TABLE 4 and stored at 20° C. for three days. Two aluminum alloy members formed of each of the alloys A-J and subjected to the heat treatment were butt-joined by a friction stir welding (FSW) process under conditions similar to those in the above Example 1 with their widthwise end portions butted to each other, thereby producing test members 21-50 each as a joined product. Thereafter, the test members 21-50 obtained by the friction stir welding were stored at 20° C. for seven days and then subjected to the Vickers hardness test, the tensile test and the formability test explained above. The results of the tests are indicated also in TABLE 4.

TABLE 3

| Test member | Alloy | Heat treatment Temperature (° C.) | Heat treatment Time (second) | Vickers hardness Stir zone | Vickers hardness Heat-affected zones | Vickers hardness Base material | Tensile strength (MPa) | Yield strength (MPa) | Elongation (%) | Fractured position | Forming limit height (mm) |
|---|---|---|---|---|---|---|---|---|---|---|---|
| 11 | A | — | — | 122 | 108 | 125 | 382 | 295 | 10 | Heat-affected zones | 13.0 |
| 12 | B | — | — | 125 | 112 | 128 | 387 | 280 | 10 | Heat-affected zones | 12.7 |
| 13 | C | — | — | 130 | 119 | 138 | 408 | 339 | 11 | Heat-affected zones | 12.5 |
| 14 | D | — | — | 54 | 47 | 57 | 160 | 87 | 12 | Heat-affected zones | 12.2 |
| 15 | E | — | — | 74 | 68 | 76 | 228 | 132 | 12 | Heat-affected zones | 13.3 |
| 16 | F | — | — | 72 | 64 | 72 | 218 | 128 | 11 | Heat-affected zones | 14.2 |
| 17 | G | — | — | 73 | 64 | 73 | 217 | 129 | 11 | Heat-affected zones | 14.3 |
| 18 | H | — | — | 78 | 72 | 80 | 250 | 142 | 12 | Heat-affected zones | 14.6 |
| 19 | I | — | — | 120 | 112 | 124 | 360 | 245 | 9 | Heat-affected zones | 13.5 |
| 20 | J | — | — | 123 | 114 | 124 | 390 | 232 | 9 | Heat-affected zones | 13.8 |

TABLE 4

| Test member | Alloy | Heat treatment Temperature (° C.) | Heat treatment Time (second) | Vickers hardness Stir zone | Vickers hardness Heat-affected zones | Vickers hardness Base material | Tensile strength (MPa) | Yield strength (MPa) | Elongation (%) | Fractured position | Forming limit height (mm) |
|---|---|---|---|---|---|---|---|---|---|---|---|
| 21 | A | 120 | 30 | 119 | 111 | 123 | 377 | 292 | 10 | Heat-affected zones | 12.8 |
| 22 | A | 380 | 30 | 97 | 92 | 91 | 305 | 253 | 15 | Base material | 14.7 |
| 23 | A | 250 | 1800 | 100 | 99 | 97 | 316 | 247 | 14 | Base material | 14.4 |
| 24 | B | 120 | 30 | 124 | 110 | 127 | 386 | 282 | 10 | Heat-affected zones | 12.6 |
| 25 | B | 380 | 30 | 93 | 90 | 89 | 297 | 251 | 15 | Base material | 14.3 |
| 26 | B | 250 | 1800 | 97 | 97 | 94 | 305 | 242 | 15 | Base material | 14.2 |
| 27 | C | 120 | 30 | 130 | 118 | 137 | 410 | 340 | 13 | Heat-affected zones | 12.4 |
| 28 | C | 380 | 30 | 96 | 92 | 92 | 300 | 260 | 15 | Base material | 14.1 |
| 29 | C | 250 | 1800 | 99 | 95 | 97 | 310 | 268 | 14 | Base material | 13.8 |
| 30 | D | 120 | 30 | 55 | 46 | 57 | 159 | 87 | 12 | Heat-affected zones | 12.4 |
| 31 | D | 380 | 30 | 49 | 43 | 42 | 157 | 75 | 13 | Base material | 13.8 |
| 32 | D | 250 | 1800 | 56 | 54 | 55 | 180 | 152 | 10 | Base material | 13.2 |
| 33 | E | 120 | 30 | 75 | 68 | 76 | 230 | 130 | 12 | Heat-affected zones | 13.5 |
| 34 | E | 380 | 30 | 62 | 64 | 60 | 210 | 111 | 12 | Base material | 14.8 |
| 35 | E | 250 | 1800 | 77 | 75 | 75 | 245 | 212 | 10 | Base material | 14.2 |
| 36 | F | 120 | 30 | 73 | 65 | 72 | 218 | 129 | 11 | Heat-affected zones | 14.2 |
| 37 | F | 380 | 30 | 58 | 58 | 56 | 196 | 112 | 12 | Base material | 13.8 |
| 38 | F | 250 | 1800 | 74 | 74 | 72 | 232 | 198 | 11 | Base material | 14.0 |
| 39 | G | 120 | 30 | 74 | 65 | 73 | 217 | 128 | 11 | Heat-affected zones | 14.1 |
| 40 | G | 380 | 30 | 59 | 59 | 55 | 197 | 111 | 12 | Base material | 13.8 |
| 41 | G | 250 | 1800 | 74 | 75 | 71 | 231 | 197 | 11 | Base material | 13.9 |
| 42 | H | 120 | 30 | 78 | 70 | 79 | 242 | 143 | 12 | Heat-affected zones | 14.4 |
| 43 | H | 380 | 30 | 65 | 64 | 62 | 215 | 118 | 11 | Base material | 14.0 |
| 44 | H | 250 | 1800 | 83 | 81 | 80 | 258 | 223 | 10 | Base material | 13.7 |
| 45 | I | 120 | 30 | 119 | 110 | 124 | 360 | 243 | 9 | Heat-affected zones | 13.6 |
| 46 | I | 380 | 30 | 95 | 92 | 91 | 315 | 195 | 12 | Base material | 14.2 |
| 47 | I | 250 | 1800 | 71 | 72 | 70 | 223 | 132 | 14 | Base material | 14.0 |
| 48 | J | 120 | 30 | 124 | 114 | 123 | 390 | 233 | 9 | Heat-affected zones | 13.9 |
| 49 | J | 380 | 30 | 82 | 83 | 80 | 275 | 157 | 11 | Base material | 14.6 |
| 50 | J | 250 | 1800 | 76 | 76 | 77 | 252 | 125 | 12 | Base material | 14.2 |

It will be apparent from the results indicated in the above TABLE 4 that, in each of the test members 21, 24, 27, 30, 33, 36, 39, 42, 45 and 48, the metal structure of the T4-treated aluminum alloy member was not reverted due to the low heat treatment temperature, the Vickers hardness of the base material was higher than that of the heat-affected zones, and fracture occurred at the heat-affected zones. Further, these test members have low values of breaking elongation and forming limit height. In each of the test members 22, 25, 28, 31, 34, 37, 40, 43, 46 and 49, softening by overaging was caused due to the high heat treatment temperature, so that the intended reversion structure was not obtained. Accordingly, these test members have low values of breaking elongation and forming limit height though fracture occurred at the base material in the tensile test. In each of the test members 23, 26, 29, 32, 38, 41, 44, 47 and 50, softening by overaging was caused due to the excessively long heat treatment time, so that the intended reversion structure was not obtained. Accordingly, these test members have low values of breaking elongation and forming limit height though fracture occurred at the base material in the tensile test.

Comparative Example 3

For comparison, initially, ten aluminum alloys A-J having respective chemical compositions which are the same as those in the above Example 1 were cast into ingots according to a DC casting method in an ordinary manner. The obtained cast ingots were then subjected to homogenization, hot rolling and cold rolling, thereby providing aluminum alloy plate members each having thickness of 1.0 mm. Subsequently, the aluminum alloy plate members were subjected to a solution heat treatment and quenching into water, and then naturally aged at room temperature for ten days. Thus, there were obtained T4 temper members. Subsequently, the thus obtained T4 temper members were subjected to a heat treatment (reversion treatment) under respective conditions indicated in the following TABLE 5 and stored at 40° C. for 30 days. Two aluminum alloy members formed of each of the alloys A-J and subjected to the heat treatment were butt-joined by the friction stir welding (FSW) process under conditions similar to those in the above Example 1 with their widthwise end portions butted to each other, thereby producing test members 51-60 each as a joined product. It is noted that, in any of the aluminum alloy members, an increase in tensile strength during a time period after the reversion treatment and before the friction stir welding exceeded 10 MPa. Thereafter, the test members 51-60 obtained by the friction stir welding were stored at 20° C. for seven days and then subjected to the Vickers hardness test, the tensile test and the formability test explained above. The results of the tests are indicated also in TABLE 5.

TABLE 5

| | | Heat treatment | | Vickers hardness | | | Tensile properties | | | | Forming |
| | | Temperature | Time | Stir | Heat-affected | Base | Tensile strength | Yield strength | Elongation | | limit height |
| Test member | Alloy | (° C.) | (second) | zone | zones | material | (MPa) | (MPa) | (%) | Fractured position | (mm) |
|---|---|---|---|---|---|---|---|---|---|---|---|
| 51 | A | 250 | 20 | 120 | 112 | 142 | 380 | 312 | 9 | Heat-affected zones | 12.5 |
| 52 | B | 240 | 30 | 121 | 115 | 135 | 384 | 294 | 9 | Heat-affected zones | 12.4 |
| 53 | C | 250 | 30 | 135 | 122 | 148 | 402 | 351 | 10 | Heat-affected zones | 12.1 |
| 54 | D | 220 | 10 | 60 | 50 | 63 | 155 | 99 | 12 | Heat-affected zones | 11.9 |
| 55 | E | 270 | 20 | 74 | 69 | 80 | 219 | 144 | 11 | Heat-affected zones | 12.9 |
| 56 | F | 250 | 5 | 69 | 62 | 79 | 206 | 141 | 10 | Heat-affected zones | 13.7 |
| 57 | G | 250 | 10 | 70 | 62 | 80 | 207 | 140 | 10 | Heat-affected zones | 13.6 |
| 58 | H | 270 | 20 | 77 | 70 | 85 | 246 | 154 | 11 | Heat-affected zones | 14.2 |
| 59 | I | 200 | 30 | 110 | 114 | 132 | 352 | 258 | 9 | Heat-affected zones | 13.4 |
| 60 | J | 180 | 20 | 121 | 112 | 128 | 386 | 239 | 8 | Heat-affected zones | 13.2 |

It is understood from the results shown in the above TABLE 5 that, in any of the test members 51-60, the friction stir welding operation was performed on the aluminum alloy members in a state in which age-hardening occurred after the reversion state, so that the Vickers hardness of the heat-affected zones was the lowest among the stir zone, the heat-affected zones and the base material. Accordingly, fracture occurred at the heat-affected zones. Moreover, all of the test members 51-60 have smaller values of elongation and smaller values of forming limit height less than 15.0 mm, as compared with the test members 1-10 in the above Example 1 each of which was obtained by joining two aluminum alloy members formed of the same aluminum alloy.

Example 2

Ten aluminum alloys K-T having respective chemical compositions shown in the following TABLE 6 were cast into ingots according to a DC casting method in an ordinary manner. The obtained cast ingots were then subjected to homogenization, hot rolling and cold rolling, thereby providing aluminum alloy plate members each having thickness of 1.0 mm. Subsequently, the aluminum alloy plate members were subjected to a solution heat treatment and quenching into water, and then naturally aged at room temperature for seven days. Thus, there were obtained T4 temper members.

TABLE 6

| | Composition (mass %) | | | | | | | | | Series |
| Alloy | Si | Fe | Cu | Mn | Mg | Cr | Zn | Ti | Al | of alloy |
|---|---|---|---|---|---|---|---|---|---|---|
| K | 0.6 | 0.28 | 4.4 | 0.8 | 0.44 | 0.03 | 0.07 | 0.03 | balance | 2000 |
| L | 0.5 | 0.29 | 4.3 | 0.6 | 0.6 | 0.04 | 0.08 | 0.02 | balance | 2000 |
| M | 0.14 | 0.20 | 4.5 | 0.7 | 1.5 | 0.02 | 0.03 | 0.02 | balance | 2000 |
| N | 0.44 | 0.18 | 0.04 | 0.06 | 0.5 | 0.03 | 0.04 | 0.02 | balance | 6000 |
| O | 0.7 | 0.15 | 0.34 | 0.15 | 1.1 | 0.22 | 0.02 | 0.03 | balance | 6000 |
| P | 1.0 | 0.14 | 0.01 | 0.09 | 0.5 | 0.02 | 0.01 | 0.02 | balance | 6000 |
| Q | 1.0 | 0.15 | 0.02 | 0.07 | 0.5 | 0.01 | 0.21 | 0.02 | balance | 6000 |
| R | 1.0 | 0.18 | 0.7 | 0.07 | 0.4 | 0.02 | 0.01 | 0.02 | balance | 6000 |
| S | 0.14 | 0.19 | 0.14 | 0.24 | 1.3 | 0.08 | 4.6 | 0.03 | balance | 7000 |
| T | 0.16 | 0.19 | 1.6 | 0.02 | 2.7 | 0.21 | 5.7 | 0.04 | balance | 7000 |

Two T4 temper members formed of each of the alloys K-T were butt-joined by the friction stir welding (FSW) process with their widthwise end portions butted to each other, thereby producing a joined product. The friction stir welding operation was carried out using a rotary tool similar to that used in the above Example 1 under the same conditions as the above Example 1. The obtained joined products were subjected to a heat treatment (reversion treatment) under respective conditions indicated in the following TABLE 7 within one hour after the friction stir welding.

The joined products 61-70 which had been subjected to the heat treatment (reversion treatment) were stored at 20° C. for seven days. Then, the Vickers hardness test, the tensile test, and the formability test described above were performed on the joined products 61-70. The results of the tests are also indicated in the following TABLE 7.

TABLE 7

| Test member | Alloy | Heat treatment Temperature (° C.) | Heat treatment Time (second) | Vickers hardness Stir zone | Vickers hardness Heat-affected zones | Vickers hardness Base material | Tensile strength (MPa) | Yield strength (MPa) | Elongation (%) | Fractured position | Forming limit height (mm) |
|---|---|---|---|---|---|---|---|---|---|---|---|
| 61 | K | 250 | 10 | 119 | 116 | 109 | 401 | 296 | 19 | base material | 16.3 |
| 62 | L | 240 | 20 | 118 | 116 | 111 | 410 | 283 | 21 | base material | 15.9 |
| 63 | M | 250 | 20 | 137 | 128 | 124 | 453 | 336 | 19 | base material | 15.8 |
| 64 | N | 220 | 20 | 60 | 54 | 50 | 186 | 83 | 23 | base material | 15.2 |
| 65 | O | 270 | 10 | 75 | 70 | 67 | 234 | 124 | 23 | base material | 16.1 |
| 66 | P | 250 | 10 | 68 | 65 | 61 | 219 | 123 | 24 | base material | 17.1 |
| 67 | Q | 250 | 5 | 69 | 64 | 60 | 218 | 123 | 25 | base material | 17.0 |
| 68 | R | 270 | 20 | 77 | 73 | 69 | 252 | 136 | 24 | base material | 17.8 |
| 69 | S | 200 | 20 | 115 | 113 | 110 | 355 | 209 | 17 | base material | 15.7 |
| 70 | T | 180 | 30 | 119 | 114 | 111 | 394 | 221 | 18 | base material | 16.3 |

It will be apparent from the results indicated in the above TABLE 7 that, in any of the test members 61-70, the hardness of the base material is the lowest among the stir zone, the heat-affected zones and the base material. It is recognized from the results of the tensile test that, in any of the test members 61-70, fracture occurred not at the heat-affected zones, but at the base material and that all of the test members 61-70 exhibit the breaking elongation of 16% or larger. It is further recognized from the results of the formability test that all of the test members 61-70 have the forming limit height of 15.0 mm or larger. It can be understood from these results that the test members 61-70 on which the reversion treatment was performed according to the present invention exhibit excellent press formability that permits sufficient deformation in press forming.

Comparative Example 4

For comparison, initially, ten aluminum alloys K-T having respective chemical compositions which are the same as those in the above Example 2 were processed in the same manner as in the above Example 2 to provide aluminum alloy plate members each having thickness of 1.0 mm. Subsequently, the aluminum alloy plate members were subjected to a solution heat treatment and quenching into water, and then naturally aged at room temperature for seven days. Thus, there were obtained T4 temper members. Two aluminum alloy members with T4 temper formed of each of the alloys K-T were butt-joined by the friction stir welding (FSW) process under conditions similar to those in the above Example 2 with their widthwise end portions butted to each other, thereby producing test members 71-80 each as a joined product. After the friction stir welding, the test members 71-80 were stored at 20° C. for seven days without performing a heat treatment (reversion treatment), and then subjected to the Vickers hardness test, the tensile test and the formability test explained above. The results of the tests are indicated also in TABLE 8.

TABLE 8

| Test member | Alloy | Heat treatment Temperature (° C.) | Heat treatment Time (second) | Vickers hardness Stir zone | Vickers hardness Heat-affected zones | Vickers hardness Base material | Tensile strength (MPa) | Yield strength (MPa) | Elongation (%) | Fractured position | Forming limit height (mm) |
|---|---|---|---|---|---|---|---|---|---|---|---|
| 71 | K | — | — | 121 | 106 | 127 | 381 | 297 | 11 | Heat-affected zones | 12.9 |
| 72 | L | — | — | 124 | 110 | 130 | 386 | 281 | 10 | Heat-affected zones | 12.6 |
| 73 | M | — | — | 129 | 118 | 138 | 408 | 338 | 12 | Heat-affected zones | 12.4 |
| 74 | N | — | — | 55 | 47 | 59 | 161 | 89 | 11 | Heat-affected zones | 12.0 |
| 75 | O | — | — | 73 | 69 | 77 | 227 | 134 | 11 | Heat-affected zones | 13.2 |
| 76 | P | — | — | 73 | 65 | 73 | 217 | 129 | 10 | Heat-affected zones | 14.2 |
| 77 | Q | — | — | 74 | 64 | 75 | 216 | 130 | 11 | Heat-affected zones | 14.4 |
| 78 | R | — | — | 79 | 71 | 82 | 252 | 144 | 12 | Heat-affected zones | 14.7 |
| 79 | S | — | — | 121 | 113 | 124 | 361 | 246 | 10 | Heat-affected zones | 13.4 |
| 80 | T | — | — | 125 | 116 | 126 | 389 | 231 | 9 | Heat-affected zones | 13.9 |

It will be apparent from the results shown in the above TABLE 8 that, in any of the test members 71-80, the Vickers hardness of the heat-affected zones is the lowest among the stir zone, the heat-affected zones and the base material since the reversion treatment was not performed after the friction stir welding. Further, in any of the test members 71-80, fracture occurred at the heat-affected zones. Moreover, all of the test members 71-80 have smaller values of elongation and smaller values of forming limit height less than 15.0 mm, as compared with the test members 61-70 of the above Example 2 each of which was obtained by joining two aluminum alloy members formed of the same aluminum alloy.

Comparative Example 5

For comparison, initially, ten aluminum alloys K-T having respective chemical compositions which are the same as those in the above Example 2 were processed in the same manner as in the above Example 2 to provide aluminum alloy plate members each having thickness of 1.0 mm. Subsequently, the aluminum alloy plate members were subjected to a solution heat treatment and quenching into water, and then naturally aged at room temperature for seven days. Thus, there were obtained T4 temper members. Two aluminum alloy members with T4 temper formed of each of the alloys K-T were butt-joined by the friction stir welding (FSW) process under conditions similar to those in the above Example 2 with their widthwise end portions butted to each other, thereby producing joined products. The joined products were subjected to a heat treatment under respective conditions indicated in the following TABLE 9 within one hour after the completion of friction stir welding, thereby providing test members 81-110. The test members 81-110 were stored at 20° C. for seven days, and the Vickers hardness test, the tensile test and the formability test explained above were performed on the test members 81-110. The results of the tests are also indicated in TABLE 9.

ing elongation and forming limit height though fracture occurred at the base material in the tensile test. In each of the test members 83, 86, 89, 92, 95, 98, 101, 104, 107 and 110, softening by overaging was caused due to the excessively long heat treatment time, so that the intended reversion structure was not obtained. Accordingly, these test members have low values of breaking elongation and forming limit height though fracture occurred at the base material in the tensile test.

Comparative Example 6

For comparison, initially, ten aluminum alloys K-T having respective chemical compositions which are the same as those in the above Example 2 were processed in the same manner as in the above Example 2 to provide aluminum

TABLE 9

| | | Heat treatment | | Vickers hardness | | | Tensile properties | | | | Forming |
| | | Temperature | Time | Stir | Heat-affected | Base | Tensile strength | Yield strength | Elongation | | limit height |
| Test member | Alloy | (° C.) | (second) | zone | zones | material | (MPa) | (MPa) | (%) | Fractured position | (mm) |
|---|---|---|---|---|---|---|---|---|---|---|---|
| 81 | K | 120 | 30 | 120 | 111 | 124 | 377 | 290 | 11 | Heat-affected zones | 12.6 |
| 82 | K | 380 | 30 | 99 | 94 | 93 | 305 | 254 | 14 | Base material | 14.5 |
| 83 | K | 250 | 1800 | 99 | 98 | 96 | 315 | 246 | 13 | Base material | 14.5 |
| 84 | L | 120 | 30 | 124 | 109 | 128 | 385 | 280 | 10 | Heat-affected zones | 12.7 |
| 85 | L | 380 | 30 | 94 | 91 | 90 | 296 | 252 | 14 | Base material | 14.1 |
| 86 | L | 250 | 1800 | 98 | 97 | 95 | 304 | 242 | 14 | Base material | 13.9 |
| 87 | M | 120 | 30 | 129 | 119 | 135 | 409 | 341 | 14 | Heat-affected zones | 12.5 |
| 88 | M | 380 | 30 | 94 | 90 | 91 | 299 | 258 | 14 | Base material | 14.0 |
| 89 | M | 250 | 1800 | 100 | 97 | 98 | 309 | 269 | 13 | Base material | 14.1 |
| 90 | N | 120 | 30 | 56 | 45 | 58 | 158 | 88 | 13 | Heat-affected zones | 12.5 |
| 91 | N | 380 | 30 | 50 | 43 | 43 | 158 | 75 | 13 | Base material | 13.9 |
| 92 | N | 250 | 1800 | 57 | 54 | 54 | 181 | 152 | 11 | Base material | 13.4 |
| 93 | O | 120 | 30 | 74 | 69 | 78 | 229 | 129 | 12 | Heat-affected zones | 13.5 |
| 94 | O | 380 | 30 | 64 | 66 | 61 | 209 | 112 | 13 | Base material | 14.7 |
| 95 | O | 250 | 1800 | 78 | 76 | 75 | 245 | 211 | 11 | Base material | 14.3 |
| 96 | P | 120 | 30 | 72 | 66 | 71 | 219 | 128 | 10 | Heat-affected zones | 14.1 |
| 97 | P | 380 | 30 | 60 | 60 | 59 | 198 | 113 | 12 | Base material | 13.7 |
| 98 | P | 250 | 1800 | 74 | 73 | 73 | 234 | 199 | 10 | Base material | 13.9 |
| 99 | Q | 120 | 30 | 75 | 64 | 72 | 218 | 129 | 10 | Heat-affected zones | 14.2 |
| 100 | Q | 380 | 30 | 58 | 58 | 53 | 195 | 112 | 11 | Base material | 13.6 |
| 101 | Q | 250 | 1800 | 75 | 76 | 71 | 233 | 198 | 11 | Base material | 13.7 |
| 102 | R | 120 | 30 | 79 | 69 | 80 | 241 | 144 | 11 | Heat-affected zones | 14.2 |
| 103 | R | 380 | 30 | 64 | 63 | 60 | 214 | 117 | 12 | Base material | 13.9 |
| 104 | R | 250 | 1800 | 85 | 80 | 80 | 259 | 222 | 11 | Base material | 13.6 |
| 105 | S | 120 | 30 | 120 | 109 | 125 | 359 | 241 | 10 | Heat-affected zones | 13.4 |
| 106 | S | 380 | 30 | 96 | 92 | 91 | 315 | 196 | 12 | Base material | 14.1 |
| 107 | S | 250 | 1800 | 73 | 71 | 71 | 224 | 132 | 13 | Base material | 13.9 |
| 108 | T | 120 | 30 | 126 | 112 | 124 | 389 | 234 | 10 | Heat-affected zones | 13.8 |
| 109 | T | 380 | 30 | 83 | 84 | 79 | 273 | 158 | 11 | Base material | 14.5 |
| 110 | T | 250 | 1800 | 75 | 75 | 75 | 253 | 124 | 12 | Base material | 14.3 |

It will be apparent from the results indicated in the above TABLE 9 that, in each of the test members 81, 84, 87, 90, 93, 96, 99, 102, 105 and 108, the metal structure of the base material portions was not reverted due to the heat treatment temperature lower than the reversion treatment temperature and the Vickers hardness of the base material was higher than that of the heat-affected zones. Further, fracture occurred at the heat-affected zones having the lowest hardness. Moreover, these test members have low values of breaking elongation of less than 16% and low values of forming limit height of less than 15.0 mm. In each of the test members 82, 85, 88, 91, 94, 97, 100, 103, 106 and 109, softening by overaging was caused due to the heat treatment temperature higher than the reversion treatment temperature, so that the intended reversion structure was not obtained. Accordingly, these test members have low values of break-alloy plate members each having thickness of 1.0 mm. Subsequently, the aluminum alloy plate members were subjected to a solution heat treatment and quenching into water, and then naturally aged at room temperature for seven days. Thus, there were obtained T4 temper members. Two aluminum alloy members with T4 temper formed of each of the alloys K-T were butt-joined by the friction stir welding (FSW) process under conditions similar to those in the above Example 2 with their widthwise end portions butted to each other, thereby producing joined products. The joined products were stored at room temperature for 72 hours after the completion of friction stir welding. Then, the joined products were subjected to a heat treatment under respective conditions indicated in the following TABLE 10, thereby providing test members 111-120. The obtained test members 111-120 were stored at 20° C. for seven days, and the Vickers hardness test, the tensile test and the formability test explained above were performed on the test members 111-120. The results of the tests are also indicated in TABLE 10.

TABLE 10

| | | Heat treatment | | Vickers hardness | | | Tensile properties | | | | Forming |
| | | | | | Heat- | | Tensile | Yield | | | |
| Test member | Alloy | Temperature (° C.) | Time (second) | Stir zone | affected zones | Base material | strength (MPa) | strength (MPa) | Elongation (%) | Fractured position | limit height (mm) |
|---|---|---|---|---|---|---|---|---|---|---|---|
| 111 | K | 250 | 10 | 112 | 108 | 111 | 379 | 294 | 12 | Heat-affected zones | 12.8 |
| 112 | L | 240 | 20 | 113 | 110 | 113 | 385 | 283 | 13 | Heat-affected zones | 12.6 |
| 113 | M | 250 | 20 | 121 | 118 | 122 | 406 | 335 | 12 | Heat-affected zones | 12.2 |
| 114 | N | 220 | 20 | 53 | 50 | 52 | 160 | 85 | 13 | Heat-affected zones | 11.9 |
| 115 | O | 270 | 10 | 67 | 64 | 66 | 227 | 125 | 13 | Heat-affected zones | 13.3 |
| 116 | P | 250 | 10 | 61 | 58 | 60 | 216 | 123 | 14 | Heat-affected zones | 14.1 |
| 117 | Q | 250 | 5 | 63 | 61 | 62 | 214 | 122 | 13 | Heat-affected zones | 14.2 |
| 118 | R | 270 | 20 | 71 | 70 | 72 | 251 | 134 | 14 | Heat-affected zones | 14.6 |
| 119 | S | 200 | 20 | 113 | 110 | 112 | 359 | 208 | 9 | Heat-affected zones | 13.3 |
| 120 | T | 180 | 30 | 112 | 109 | 110 | 388 | 219 | 10 | Heat-affected zones | 13.7 |

It is understood from the results shown in the above TABLE 10 that, in any of the test members 111-120, the friction stir welding operation was performed on the aluminum alloy members which had suffered from age-hardening after the friction stir welding, so that the stir zone, the heat-affected zones and the base material have the Vickers hardness values substantially equal to one another and the Vickers hardness of the heat-affected zones is slightly smaller than those of the stir zone and the base material. Accordingly, fracture occurred at the heat-affected zones. Moreover, all of the test members 111-120 have low values of breaking elongation less than 16% and low values of forming limit height less than 15.0 mm.

What is claimed:

1. A method of joining heat-treatable aluminum alloy members by friction stir welding, comprising the steps of:
   a T4-treatment-performing step of performing a T4 treatment on the heat-treatable aluminum alloy members so as to impart T4 temper to the heat-treatable aluminum alloy members;
   a joining step of joining the T4 heat-treated aluminum alloy members with T4 temper by friction stir welding, wherein each T4 heat-treated aluminum alloy member has a length and a width, and wherein the T4 heat-treated aluminum alloy members are butted together along the lengths thereof and friction stir welded along the abutted lengths to provide a joined product; and
   a reversion-treatment-performing step of applying heat from a reversion treatment directly across an entire width of the T4 heat-treated aluminum alloy members, the reversion-treatment-performing step being carried out after the joining step so as to perform the reversion treatment on the joined product obtained in the joining step, before GP zones are formed at a stir zone of the joined product, and before a time period during which the joined product undergoes natural aging that occurs after the T4 heat-treated aluminum alloy members have been joined by friction stir welding exceeds 24 hours, wherein the stir zone of the joined product is formed along said welded length of the joined product, with a heat-affected zone located outwardly of the stir zone and base material portions of the joined product being areas other than the stir zone and the heat-affected zone in a widthwise direction of the joined product,
   wherein upon completing both the joining step and the reversion-treatment-performing step, a hardness of the stir zone is the highest, with a hardness of the heat-affected zone being the second highest, and a hardness of the base material portions being the lowest, and
   wherein each of the T4 heat-treated aluminum alloy members is formed of a 6000 series aluminum alloy and the reversion treatment is a heat treatment in which the T4 heat-treated aluminum alloy members are heated at an elevated temperature of 200-350° C. for a time period of not longer than 300 seconds.

2. The method according to claim 1, wherein the reversion treatment is performed using a heating means selected from a salt bath, an oil bath, an air-heating furnace, an iron, infrared heating and induction heating.

3. The method according to claim 1, wherein the joining step is carried out such that the T4 heat-treated alloy members are joined together sequentially along portions thereof at which the T4 heat-treated aluminum alloy members are to be joined by friction stir welding and the reversion-treatment-performing step is carried out such that the reversion treatment is sequentially performed, using a suitable heating device, on and directly across the entire width of the joined product formed by friction stir welding in the joining step.

4. The method according to claim 1, wherein the joining step and the reversion-treatment-performing step are carried out discontinuously.

5. The method according to claim 4, wherein the joining step is carried out on one manufacturing line and the reversion-treatment-performing step is carried out on a separate manufacturing line.

6. A method of joining heat-treatable aluminum alloy members by friction stir welding, comprising the steps of:
   a T4-treatment-performing step of performing a T4 treatment on the heat-treatable aluminum alloy members so as to impart T4 temper to the heat-treatable aluminum alloy members;
   a joining step of joining the T4 heat-treated aluminum alloy members with T4 temper by friction stir welding, wherein each T4 heat-treated aluminum alloy member has a length and a width, and wherein the T4 heat-treated aluminum alloy members are butted together along the lengths thereof and friction stir welded along the abutted lengths to provide a joined product; and
   a reversion-treatment-performing step of applying heat from a reversion treatment directly across an entire width of the T4 heat-treated aluminum alloy members, the reversion-treatment-performing step being carried out after the joining step so as to perform the reversion treatment on the joined product obtained in the joining step, before GP zones are formed at a stir zone of the joined product, and before a time period during which the joined product undergoes natural aging that occurs after the T4 heat-treated aluminum alloy members have been joined by friction stir welding exceeds 24 hours, wherein the stir zone of the joined product is formed along said welded length of the joined product, with a heat-affected zone located outwardly of the stir zone and base material portions of the joined product being areas other than the stir zone and the heat-affected zone in a widthwise direction of the joined product, wherein upon completing both the joining step and the reversion-treatment-performing step, a hardness of the stir zone is the highest, with a hardness of the heat-affected zone being the second highest, and a hardness of the base material portions being the lowest, and wherein each of the T4 heat-treated aluminum alloy members is formed of a 2000 series aluminum alloy and the reversion treatment is a heat treatment in which the T4 heat-treated aluminum alloy members are heated at an elevated temperature of 150-300° C. for a time period of not longer than 300 seconds.

7. A method of joining heat-treatable aluminum alloy members by friction stir welding, comprising the steps of:
   a T4-treatment-performing step of performing a T4 treatment on the heat-treatable aluminum alloy members so as to impart T4 temper to the heat-treatable aluminum alloy members;
   a joining step of joining the T4 heat-treated aluminum alloy members with T4 temper by friction stir welding, wherein each T4 heat-treated aluminum alloy member has a length and a width, and wherein the T4 heat-treated aluminum alloy members are butted together along the lengths thereof and friction stir welded along the abutted lengths to provide a joined product; and
   a reversion-treatment-performing step of applying heat from a reversion treatment directly across an entire width of the T4 heat-treated aluminum alloy members, the reversion-treatment-performing step being carried out after the joining step so as to perform the reversion treatment on the joined product obtained in the joining step, before GP zones are formed at a stir zone of the joined product, and before a time period during which the joined product undergoes natural aging that occurs after the T4 heat-treated aluminum alloy members have been joined by friction stir welding exceeds 24 hours, wherein the stir zone of the joined product is formed along said welded length of the joined product, with a heat-affected zone located outwardly of the stir zone and base material portions of the joined product being areas other than the stir zone and the heat-affected zone in a widthwise direction of the joined product, wherein upon completing both the joining step and the reversion-treatment-performing step, a hardness of the stir zone is the highest, with a hardness of the heat-affected zone being the second highest, and a hardness of the base material portions being the lowest, and wherein each of the T4 heat-treated aluminum alloy members is formed of a 7000 series aluminum alloy and the reversion treatment is a heat treatment in which the T4 heat-treated aluminum alloy members are heated at an elevated temperature of 150-250° C. for a time period of not longer than 300 seconds.

8. The method according to claim 6, wherein the reversion treatment is performed using a heating means selected from a salt bath, an oil bath, an air-heating furnace, an iron, infrared heating and induction heating.

9. The method according to claim 7, wherein the reversion treatment is performed using a heating means selected from a salt bath, an oil bath, an air-heating furnace, an iron, infrared heating and induction heating.

10. The method according to claim 6, wherein the joining step is carried out such that the T4 heat-treated alloy members are joined together sequentially along portions thereof at which the T4 heat-treated aluminum alloy members are to be joined by friction stir welding and the reversion-treatment-performing step is carried out such that the reversion treatment is sequentially performed, using a suitable heating device, on and directly across the entire width of the joined product formed by friction stir welding in the joining step.

11. The method according to claim 7, wherein the joining step is carried out such that the T4 heat-treated alloy members are joined together sequentially along portions thereof at which the T4 heat-treated aluminum alloy members are to be joined by friction stir welding and the reversion-treatment-performing step is carried out such that the reversion treatment is sequentially performed, using a suitable heating device, on and directly across the entire width of the joined product formed by friction stir welding in the joining step.

12. The method according to claim 6, wherein the joining step and the reversion-treatment-performing step are carried out discontinuously.

13. The method according to claim 7, wherein the joining step and the reversion-treatment-performing step are carried out discontinuously.

14. The method according to claim 12, wherein the joining step is carried out on one manufacturing line and the reversion-treatment-performing step is carried out on a separate manufacturing line.

15. The method according to claim 13, wherein the joining step is carried out on one manufacturing line and the reversion-treatment-performing step is carried out on a separate manufacturing line.

* * * * *